US010352420B2

(12) United States Patent
Hisada et al.

(10) Patent No.: US 10,352,420 B2
(45) Date of Patent: Jul. 16, 2019

(54) CONTINUOUSLY VARIABLE TRANSMISSION

(71) Applicant: HONDA MOTOR CO., LTD., Tokyo (JP)

(72) Inventors: Keisuke Hisada, Wako (JP); Atsushi Kobayashi, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 131 days.

(21) Appl. No.: 15/514,671

(22) PCT Filed: Aug. 27, 2015

(86) PCT No.: PCT/JP2015/074192
§ 371 (c)(1),
(2) Date: Mar. 27, 2017

(87) PCT Pub. No.: WO2016/052021
PCT Pub. Date: Apr. 7, 2016

(65) Prior Publication Data
US 2017/0234415 A1    Aug. 17, 2017

(30) Foreign Application Priority Data
Oct. 1, 2014    (JP) .................................. 2014-203452

(51) Int. Cl.
*F16H 37/08*    (2006.01)
*F16H 61/70*    (2006.01)
(Continued)

(52) U.S. Cl.
CPC ....... *F16H 37/0846* (2013.01); *F16H 37/021* (2013.01); *F16H 37/022* (2013.01);
(Continued)

(58) Field of Classification Search
None
See application file for complete search history.

(56) References Cited

U.S. PATENT DOCUMENTS 4,458,558 A *  7/1984  Frank ................... F16H 37/021
                                                    474/28
5,407,394 A    4/1995  Robbins
(Continued)

FOREIGN PATENT DOCUMENTS

JP    6-341500 A    12/1994
JP    3733893 B2    1/2006
(Continued)

OTHER PUBLICATIONS

International Search Report dated Nov. 17, 2015, issued in counterpart International Application No. PCT/JP2015/074192 (2 pages).
(Continued)

*Primary Examiner* — Colby M Hansen
(74) *Attorney, Agent, or Firm* — Westerman, Hattori, Daniels & Adrian, LLP

(57) ABSTRACT

A continuously variable transmission is configured wherein an outer diameter of a first pulley 11 is smaller than an outer diameter of a second pulley 12, a first input shaft 1' and a second input shaft 2' have a parallel coaxial structure, the first input shaft 1' and a first output shaft 14 are linked via a LO clutch 3" and a first transmission gear assembly 8; and the second input shaft 2' and a second output shaft 15 are linked via a HI clutch 3' and a second transmission gear assembly 9. In-low-speed mode, a drive torque outputted from the second pulley 12 is transmitted to a differential via the second transmission gear assembly, a second low-speed gear 23, and a low final gear 16, whereas in high-speed mode, a drive torque outputted from the first pulley is transmitted to the differential via a high final gear 18.

3 Claims, 15 Drawing Sheets

(51) Int. Cl.
   *F16H 37/02*   (2006.01)
   *F16H 61/66*   (2006.01)
(52) U.S. Cl.
   CPC .............. *F16H 61/70* (2013.01); *F16H 61/66* (2013.01); *F16H 2037/025* (2013.01)

(56) References Cited

U.S. PATENT DOCUMENTS

| | | | | |
|---|---|---|---|---|
| 7,815,537 | B2* | 10/2010 | Triller | F16H 37/084 |
| | | | | 475/210 |
| 8,123,646 | B2* | 2/2012 | Triller | F16H 37/021 |
| | | | | 475/211 |
| 2010/0075800 | A1* | 3/2010 | Suzuki | F16H 37/022 |
| | | | | 477/44 |
| 2015/0133257 | A1 | 5/2015 | Uchino et al. | |

FOREIGN PATENT DOCUMENTS

| | | |
|---|---|---|
| JP | 2008-208854 A | 9/2008 |
| WO | 2013/175568 A1 | 11/2013 |

OTHER PUBLICATIONS

Notification of Reasons for Rejection dated Jan. 23, 2018, issued in counterpart Chinese Application No. 201580053008.7, with English transaltion. (14 pages).

* cited by examiner

CONTINUOUSLY VARIABLE TRANSMISSION

RELATED ART

This invention relates to a continuously variable transmission, and more specifically, a continuously variable transmission which can preferably ensure a desired range of whole transmission ratio (i.e. overall ratio range) that will be required in the future while having high belt transmitting efficiency and low ring damage (i.e. belt fatigue) in pulleys without increasing weight of the transmission.

BACKGROUND

A wide ratio range of transmission is generally advantageous for lowering loads of the engine and improving the fuel consumption rate of the vehicle due to allowing the vehicle to smoothly start and accelerate with the low load of the engine, as well as to cruise at high speed with the low revolution thereof. In case of the belt continuously variable transmission, the transmission ratio is defined by the ratio of the belt curvatures between the drive and driven pulleys. Therefore, the conventional continuously variable transmission has been made to have outer diameters and center distance of pulleys as large as possible, in order to obtain a wide ratio range. Meanwhile, both the belt transmitting efficiency and the ring damage have a characteristic to become extremely worse at vicinities of the ratio ends (i.e. low and overdrive ratio ends) of the pulley ratio range, and thus the wide pulley ratio range is rather considered not to be so preferable for the transmitting efficiency and endurance of the belt (i.e. the usable life of the belt). Nevertheless, in light of the whole automobile system, the wide pulley ratio range is considered to make a large contribution to alleviation of the engine load and improvement of the fuel consumption rate, even though it has such a demerit that may cause the degradation of the belt transmitting efficiency and the ring damage. It is thought that in the future the transmission is required for a lower revolution of the engine at vehicle cruise (i.e. an extended overdrive ratio end), a lower transmission ratio (i.e. an extended low ratio end) due to spread of turbo charged engines which is based on concept of downsized engine that can compensate low torque in low revolution range, and a higher transmission ratio (i.e. an extended overdrive ratio end) which can apply to high torque in middle and high revolution ranges. Therefore, the overall transmission ratio range (i.e. an overall ratio range) has an advantage for the above-mentioned requirements. Also, a continuously variable transmission is well known that an output portion of pulley unit has a planetary gear mechanism to be capable of having a wider overall transmission ratio than pulley ratio (See patent document 1: Publication No. JP3733893.). If outer diameters and shaft distance of the pulley unit are extended in order to have a wide pulley ratio range, a weight of pulley unit itself is supposed to increase due to extended outer diameter. In addition, a variable range of belt curvature radius at the pulley is extended and consequently, maximum value of the belt curvature radius becomes greater while minimum value thereof becomes smaller. When the belt curvature radius at the pulley is extended, the weight of pulley unit itself becomes much more increased due to satisfaction with requirement for rigidity. When the minimum value of the belt curvature radius at the pulley becomes smaller, a size of the belt becomes greater due to increments of operation frequency in high load range of the belt and consequently, a weight of belt itself becomes greater as well. In the meanwhile, when the shaft distance between the pulleys becomes greater, a total length of the belt becomes greater as well, thereby the weight of the belt itself becomes greater as well as the pulley. As described above, when outer diameters and shaft distance of the pulley unit are both extended, there occurs such a problem that a total weight of the transmission having the pulley unit increases due to weight increment of the pulley and belt. The conventional continuously variable transmission as disclose in the patent document 1 is thought to have similar problems concerning the above-mentioned weight increment as well. Also, When the outer diameters and the shaft distance of the pulley unit are both extended, a fuel consumption rate of the vehicle is deteriorated and an endurance of the belt is lowered since an operation frequency of the belt in range of high load becomes to increase and the pulley unit operates within a range where the belt has a low transmitting efficiency and a large ring damage.

Patent document 1: The publication of Japanese Patent No. JP3733893.

SUMMARY OF THE INVENTION

Therefore, the present invention is achieved to solve the above-mentioned problems. And a purpose of the present invention is to provide a continuously variable transmission which can preferably ensure a desired range of whole transmission ratio that will be required in the future while having high belt transmitting efficiency and low ring damage (i.e. belt fatigue) in a pulley unit without increasing weight of the transmission.

To solve the above-mentioned problems, a continuously variable transmission in accordance with the present invention comprises an input shaft (1, 2, 1', 2', 2") receiving a drive torque input from a power source; a first output shaft (14, 14') and a second output shaft (15, 15') disposed in parallel to the input shaft (1, 2, 1', 2', 2"); a first rotational mechanism disposed on the first output shaft (14, 14'); a second rotational mechanism (12, 12') disposed on the second output shaft (15, 15'); a power transmitting means (13, 13') transmitting a drive torque between the first and second mechanisms (11, 11', 12, 12'); a first transmission gear assembly (8, 8') disposed in a power transmission path from the power source to the first rotational mechanism (11, 11') to change a revolution of drive torque; and a second transmission gear assembly (12, 12') disposed in a power transmission path from the second rotational mechanism to a differential (D/G) to change a revolution of drive torque, wherein an outer diameter of the first rotational mechanism (11, 11') is smaller than an outer diameter of the second rotational mechanism (12, 12').

In the above-mentioned configuration, the outer diameter of the first rotational mechanism (e.g. pulley or disk) is configured to be smaller than that of the second rotational mechanism, thereby allowing the first and second rotational mechanisms to have a transmission ratio range (i.e. transmission ratio range of the rotational mechanisms) narrowed and consequently to operate within a range where the power transmitting means (e.g. V-belt or power roller) has a high transmitting efficiency and a small load. As the result, the power transmitting means is ensured to have a high transmitting efficiency and a small load (e.g. load of the belt or load of the power roller) without increasing weight of the rotational mechanism.

Furthermore in a continuously variable transmission according to the present invention, are provided a first transmission path wherein a drive torque from the power source is transmitted to the differential (D/G) via a first clutch (3"), the first output shaft (14, 14'), the first rotational mechanism (11, 11'), the second rotational mechanism (12, 12') and the second output shaft (15, 15'); and a second transmission path wherein a drive torque from the power source is transmitted to the differential (D/G) via a second clutch (3'), the second output shaft (15, 15'), the second rotational mechanism (12, 12'), the first rotational mechanism (11, 11') and the first output shaft (14, 14').

In the above-mentioned configuration, the first rotational mechanism serves as a "drive" rotational mechanism in the first transmission path whereas the second rotational mechanism serves as a "drive" rotational mechanism in the second transmission path. Thus, it becomes possible to make the continuous variable transmission to have a range of whole transmission ratio extended to be wider, even though the rotational mechanisms have a transmission ratio range narrowed due to the configuration of different outer diameters thereof. Also, when the overall ratio range has some margins for desired ratio range (target ratio range), it is possible to make the shaft distance of the rotational mechanisms to be shortened, thereby allowing the transmission ratio range of the rotational mechanisms to be further narrowed and the first and second rotational mechanisms to operate within a range where the power transmitting means has a higher transmitting efficiency and a smaller load thereof.

Furthermore in a transmission according to the present invention, a maximum transmission ratio of the first transmission path is configured to be greater than a maximum transmission ratio of the second transmission path.

In the above-mentioned configuration, the first transmission path where the first rotational mechanism with a smaller outer diameter serves as the drive rotational mechanism is supposed to be used earlier than the second transmission path where the second rotational mechanism with a greater outer diameter serves as the drive rotational mechanism. It thereby becomes possible to make the overall transmission ratio range to be most appropriate.

Furthermore, in a transmission according to the present invention, the first and second transmission paths are configured to have a same transmission ratio when a transmission ratio between the first and second rotational mechanisms (11, 11', 12, 12') becomes equal to a given value.

In the above-mentioned configuration, the first and second rotational mechanisms mutually switch a drive/driven relation therebetween when the first and second transmission paths have a same transmission ratio, thereby allowing to switch the first and second transmission paths with a difference revolution kept zero.

Effect of the Invention

In a continuously variable transmission according to the present invention, an outer diameter of the first rotational mechanism (e.g. drive pulley or input disk) is configured to be smaller than an outer diameter of the second rotational mechanism (e.g. driven pulley or output disk), thereby allowing the first and second rotational mechanisms to have a transmission ratio range narrowed. In the result, it becomes possibly to make the first and second rotational mechanisms to operate within a range where a power transmitting means has a high transmitting efficiency and small load. Also, an input/output relation (i.e. drive/driven relation) is configured to mutually switch between the first and second rotational mechanisms. Thus, it becomes possible to make the continuous variable transmission to have a range of whole transmission ratio extended to be wider than a single transmission ratio of the rotational mechanisms, even though the rotational mechanisms have a transmission ratio range narrowed due to the configuration of different outer diameters thereof. Therefore, for a transmission ratio range and a transmitting efficiency/load of the power transmitting means or a weight of the transmission in which a conventional continuously variable transmission has a trade-off correlation, a continuously variable transmission according the present invention allows for preferably ensuring a desired range of whole transmission ratio that will be required in the future while a power transmitting means has a high transmitting efficiency and small load without increasing weight of the transmission. Also, when the overall ratio range has some margins for desired ratio range (target ratio range), it is possible to make the shaft distance of the rotational mechanism to be further shortened, thereby allowing the transmission ratio range of the rotational mechanisms to be much narrower (i.e. narrowed) and the first and second rotational mechanisms to operate within a range where the power transmitting means has much higher transmitting efficiency and much smaller load thereof. Therefore, if a continuously variable transmission according to the present invention is applied to vehicles, fuel consumption rate of the vehicle is to be improved as well as the usable life of the power transmitting means like a V-belt, further, a lightweight of whole transmission to be realized.

DETAILED DESCRIPTION

Embodiments of the present invention are hereinafter described in detail with reference to attached drawings.

Figure 1:
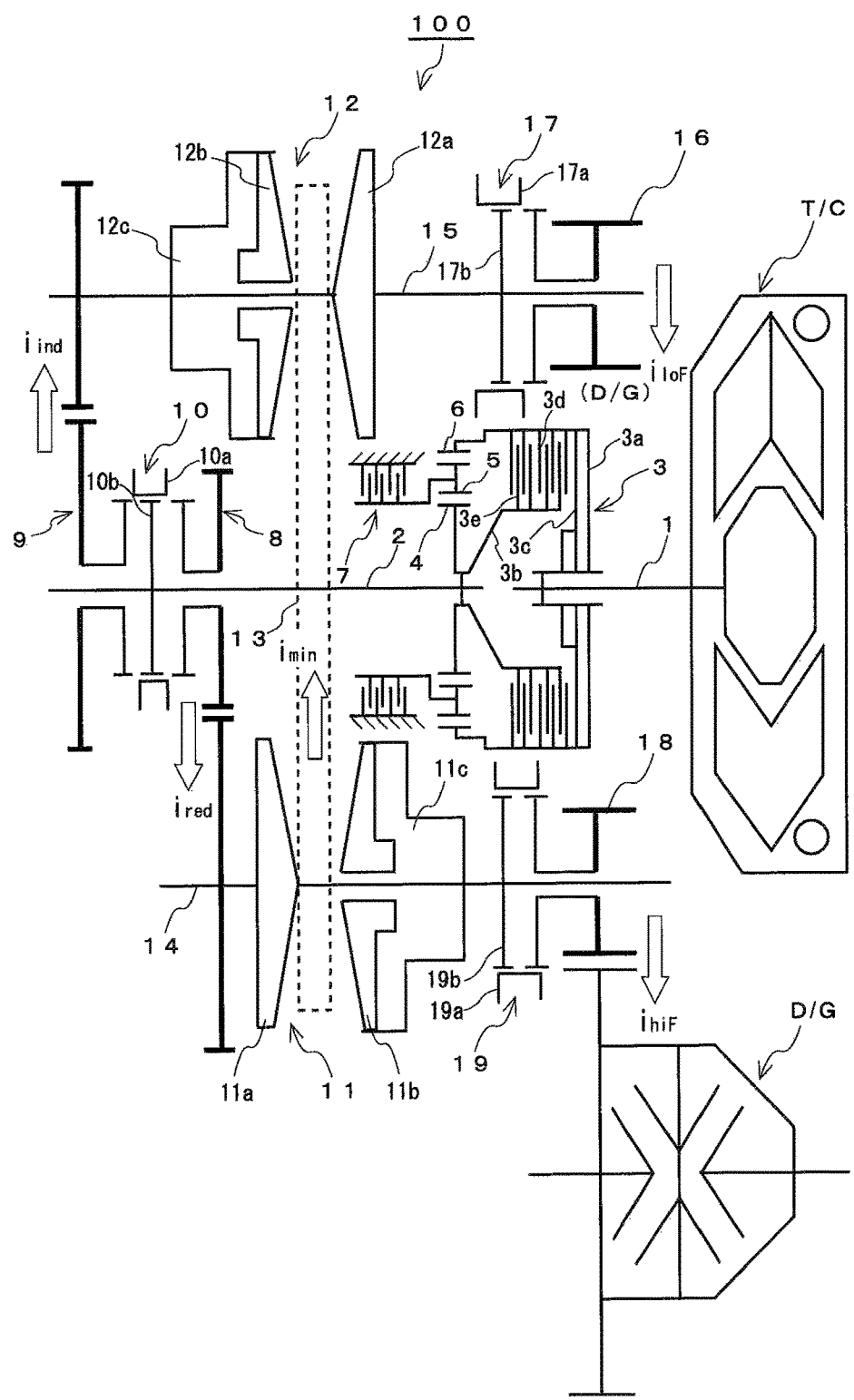
FIG. 1 is an explanation drawing to show a configuration of a continuously variable transmission in accordance with the present invention.

FIG. 1 is an explanation drawing to show a configuration of a continuously variable transmission 100 in accordance with the present invention. It should be noted that, for convenience of explanation, a torque converter T/C and a differential D/G are also shown in the figure. This continuously variable transmission 100, as described below in detail with reference to FIGS. 2 to 4, is configured so that an outer diameter of a first pulley 11 is smaller than an outer diameter of a second pulley 12, thereby allowing a ratio range of a pulley unit to be narrower and consequently the first and second pulleys 11, 12 to operate within a range where a belt has a high transmitting efficiency and small ring damage (i.e. load of the belt). Also, as described below in detail with reference to FIGS. 5 to 11, the continuously variable transmission 100 is configured so that an input/output relation (i.e. drive/driven relation) in accordance with power transmission of pulley unit is capable of switching, thereby allowing a range of whole transmission ratio (i.e. overall ratio range) extended to be wider than a ratio range of the pulley unit. Thus, it becomes possible to make the continuous variable transmission to have a desired range of whole transmission ratio that will be required in the future, even though the ratio range of the pulley unit have a ratio range narrowed due to the above-mentioned configuration of different outer diameters of the pulley unit. Also, when the overall ratio range has some margins for a desired ratio range (target ratio range), it is possible to make a pulley shaft distance to be shortened, thereby allowing the ratio range of the pulley unit to be much narrower (i.e. narrowed) and the first and second pulleys 11, 12 to operate within a range where the belt has a much higher transmitting efficiency and a much smaller load.

Therefore, the continuously variable transmission 100 includes a first input shaft 1 receiving a drive torque input from a torque converter T/C; a second input shaft 2 serially connected to the first input shaft 1 via a clutch 3 that connects or disconnects the first and second input shafts 1,2; a sun gear 4 fixed on the second input shaft 2; a planetary gear 5 engaged with both of the sun gear 4 and a ring gear 6 integrated with a clutch drum 3a of the clutch 3; a reverse brake 7 restricting a rotation of the planetary gear 5 around the sun gear 4 (i.e. the second input shaft 2); a reduction gear couple (hereinafter referred to as "first transmission gear assembly") 8 for a low-speed mode (i.e. low mode or LO mode) to reduce a revolution of drive torque which is input from the second input shaft 2 and transmit to the first pulley 11; a induction gear couple (hereinafter referred to as "second transmission gear assembly") 9 for a high-speed mode (i.e. high mode or HI mode) to increase a revolution of drive torque which is input from the second input shaft 2 and transmit to the second pulley 12; a synchronizer for switching high or low-speed mode (hereinafter referred to as "first synchronizer") 10 to make the first or second transmission gear assembly 8, 9 selectively engaged with the second input shaft 2; first and second pulleys 11, 12 to change transmission ratio by changing each of curvature radii of a V-belt 13 mounted on the pulleys; the V-belt 13 that transmits a drive torque between the first and second pulleys 11,12; a first output shaft 14 that is a rotating shaft of the first pulley 11; a second output shaft 15 that is a rotating shaft of the second pulley 12; a low final gear 16 that is a final reduction gear at time of the low-speed mode; a synchronizer for the low final gear (hereinafter referred to as "second synchronizer") 17 to make the low final gear 16 selectively engaged with the second output shaft 15; a high final gear 18 that is a final reduction gear at time of the high-speed mode; and a synchronizer for high final gear (hereinafter referred to as "third synchronizer") 19 to make the high final gear 18 selectively engaged with the first output shaft 14. Note that the "low-speed mode" as used herein means a transmission mode where a pulley ratio is made changed within a given range while the first pulley 11 is a drive pulley and the second pulley 12 a driven pulley. On the contrary, the "high-speed mode" as used herein means a transmission mode where a pulley ratio is made to be changed within a given range while the first pulley 11 is a driven pulley and the second pulley 12 a drive pulley. And each of elements is further described below.

The clutch 3 is e.g. a wet multiplate-type clutch, having a clutch drum 3a fixed on the first input shaft 1, a clutch hub 3b fixed on the second input shaft 2 and a piston 3c disposed between the clutch drum 3a and hub 3b. A number of first plates 3d are respectively disposed straight on an inner circumferential surface of the clutch drum 3a. A number of second plates 3e are respectively disposed, as set between the first plates 3d, on an outer circumferential surface of the clutch hub 3b. Thus, the first and second plates 3d, 3e are alternately disposed to face each other, respectively. When oil pressure is supplied to the piston 3c via oil path (not shown) formed inside of the first input shaft 1, the piston 3c is supposed to move in left direction and press the first plate 3d to the second plate 3e. In the result, the first plate 3d becomes engaged with the second plate 3e by the piston 3C, and consequently the first input shaft 1 becomes connected to the second shaft 2. On the other hand, when oil pressure is discharged via the oil path, pressure of piston 3c is reduced, thereby releasing the first and second plates 3d, 3e. In the result, the first input shaft 1 becomes disconnected to the second shaft 2.

The sun gear 4, the planetary gear 5 and the ring gear 6 form a planetary gear mechanism. As described below, when the reverse brake 7 is engaged under the condition that the clutch 3 is engaged, a drive torque input from the first input shaft 1 is reversely rotated and transmitted to the second input shaft 2 and then output along such a power transmission path as the first output shaft 14, the first pulley 11, the V-belt 13, the second pulley 12, the second output shaft 15, the second synchronizer 17, the low final gear 16 and the differential D/G in that order. It is thereby possible to realize a reverse mode.

The reverse brake 7 is a wet multiplate-type clutch similar to the clutch 3 and an engage/disengage mechanism of the reverse brake 7 is, therefore, the same as that of the clutch 3. Note that a clutch drum is fixed on a transmission case (not shown) and the clutch hub is constantly connected for rotation with the planetary gear 5.

The first transmission gear assembly 8 is a revolution reducing gear whose gear ratio $i_{red}$ is greater than 1 whereas the second transmission gear assembly 9 is a revolution increasing gear whose gear ratio is smaller than 1. When a "$i_{LoF}$" is defined as a gear ratio between the low final gear 16 and the differential D/G (i.e. final driven gear), a "$i_{hiF}$" as a gear ratio between the high final gear 18 and the differential D/G (i.e. final driven gear), and a "$i_{min}$" as a minimum of the pulley ratio, the ratios $i_{red}$, $i_{ind}$, $i_{LoF}$, $i_{hiF}$ and $i_{min}$ have such a relational expression as follows:

$$i_{red} \times i_{min} = i_{ind} \qquad \text{Expression 1}$$

$$i_{LoF} \times i_{min} = i_{hiF}. \qquad \text{Expression 2}$$

That is, the above-mentioned ratios are selected to satisfy the expressions 1 and 2 so that each of the difference revolutions at the second pulley 12 and the differential D/G is both zero at right before and after a transmission mode switches from the low-speed mode to the high-speed mode.

The first, second and third synchronizers 10, 17, 19 are fixed on the second input shaft 2, the first output shaft 14, the second output shaft 15, respectively; having synchro-hubs 10b, 17b, 19b support after-mentioned synchro-sleeves 10a, 17a, 19a capable of sliding at outer ends thereof, a blocking ring (not shown) disposed on inner circumferential surfaces of the synchro-hubs 10b, 17b, 19b so as to contact a cone surface of an input or output gear and absorb a difference revolution between a rotating shaft and the gear, an annular spring (not shown) disposed between the synchro-sleeves 10a, 17a, 19a and the blocking ring so as to make loads of synchro-sleeves buffered and dispersed equally over the blocking ring, the synchro-sleeves 10a, 17a, 19a to mesh with both of dog-teeth like clutches (not shown) disposed on the outer end of blocking ring and the input or output gear. Therefore, the synchro-sleeves 10a, 17a, 19a are moved to the left or right side by shift forks (not shown) and consequently spline teeth thereof seriously penetrates between spaces of teeth of the gear and blocking ring, thereby allowing the first and second transmission gear assemblies 8, 9 or the low and high final gears 16, 18 connected to the second input shaft 2, the first output shaft 14 or the second output shaft 15 for rotation, respectively.

The first pulley 11 comprises a first stationary pulley 11a and a first movable pulley 11b, and the stationary pulley 11a is fixed on the first output shaft 14 and not slidable relative thereto. In contrast, a cylinder chamber 11c is provided to the first movable pulley 11b, whereby the first movable pulley 11b can axially slide relative to the first output shaft 14 depending on oil pressure (i.e. side pressure) supplied to the cylinder chamber 11c. Thus, the oil pressure supplied to the cylinder chamber 11c is to be varied, whereby a pulley groove formed between the first stationary and movable pulleys 11a, 11b is changeable. Note that the second pulley 12 is also comprised of the same as the first pulley 11 in the above-mentioned.

Also, the first and second pulleys 11,12, are comprised of "different diameter pulleys" that an outer diameter φODia1 of the first pulley 11 is smaller than an outer diameter φODia2 of the second pulley 12, as described below in detail with reference to FIG. 2.

Also, the V-belt 13 comprising a number of elements (not shown) and two rings (not shown) disposed to fit in both sides of the elements, thereby allowing a V-surface of the element to be compressed to each pulley surface by the rings and thereby allowing a drive torque from engine to be transmitted by friction force from the first pulley 11 to the second pulley 12 or vice versa. Thus, each of the side pressures of the first and second pulleys 11,12 is respectively increased/decreased, thereby making each of pulley widths changed, and thereby causing each of curvature radii at both pulleys to be changed. As the result, it becomes possible to transmit a transmitted drive torque at a transmission ratio in response to ratio of the curvature radii at both pulleys from the first pulley 11 to the second pulley 12 or vice versa.

Figure 2A:
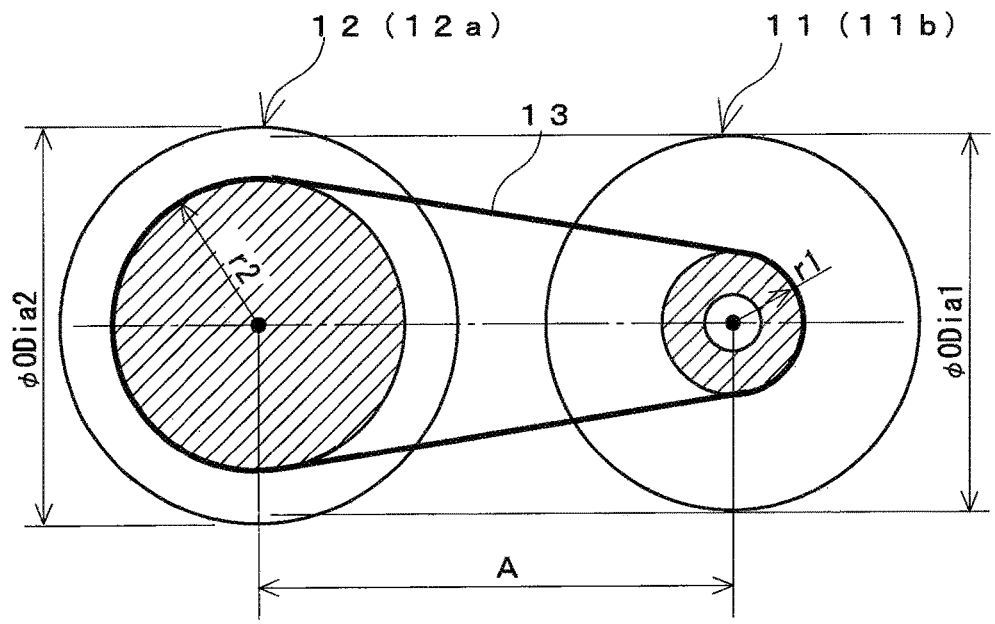
FIG. 2 is an explanation drawing to show a configuration of first and second pulleys in accordance with the present invention.
Figure 15B:
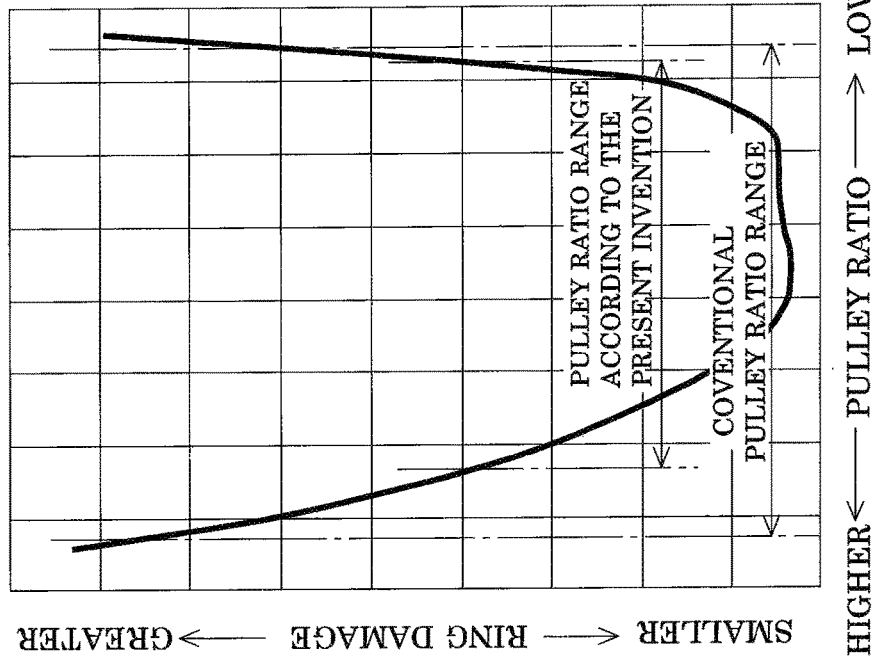
FIG. 15 is a graph to show a correlation among a pulley ratio, a belt transmitting efficiency and a ring damage of a continuously variable transmission in accordance with the present invention.
Figure 15A:
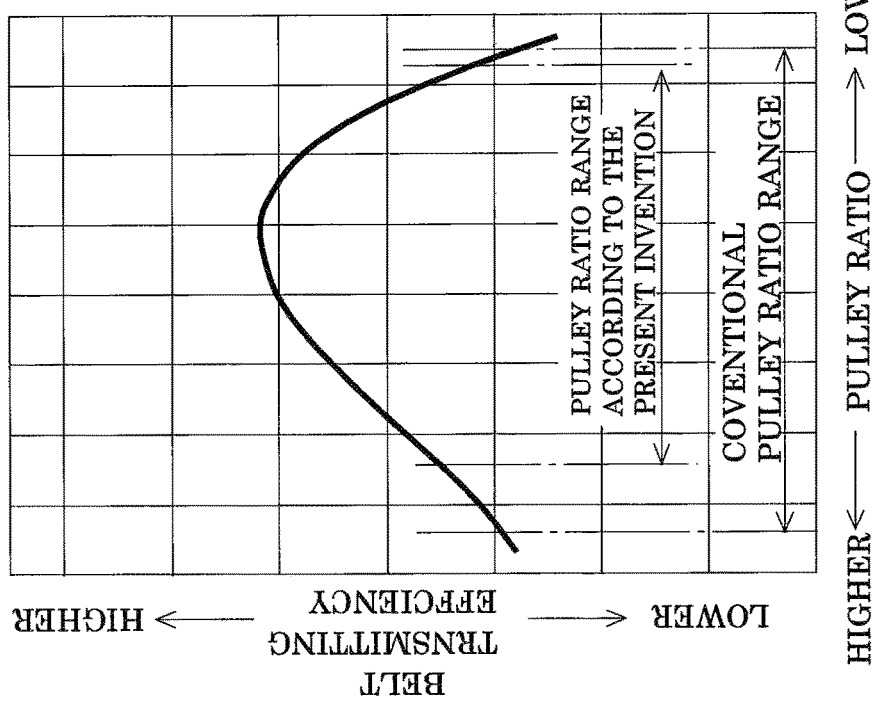

FIG. 2 is an explanation drawing to show a configuration of the first and second pulleys 11, 12 in accordance with the present invention. As shown in FIG. 2A, the outer diameter φODia1 of the first pulley 11 is smaller than the outer diameter φODia2 of the second pulley 12. Pulleys have different outer diameters thereby allowing an operating range of the V-belt 13 at the first pulley 11 to be narrower in comparison with pulleys of same outer diameters, which causes transmission ratio range of the first and second pulleys 11, 12 to be narrower as well. As the result, the first and second pulley 11, 12 can operate within a range where a belt has a high transmitting efficiency and low ring damage (i.e. belt fatigue) as shown in FIG. 15.

Figure 2B:
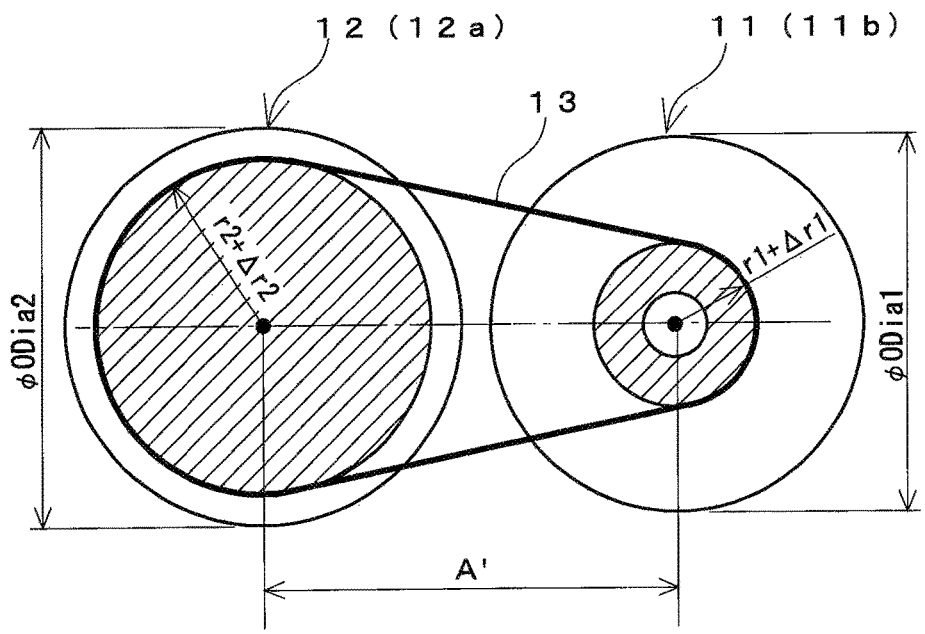

Also, when a pulley shaft distance is shortened (A→A'), as shown in FIG. 2B, on condition that the belt 13 has a constant outer diameter (i.e. a constant circumferential length), each curvature radius of the V-belt 13 at the corresponding pulley is further extended (r1→R1+Δr1, r2→r2+Δr2) in comparison with the FIG. 2A, thereby allowing an operation range of the V-belt 13 at the first pulley 11 to be narrower in comparison with pulley shaft distance A'.

However, the continuously variable transmission 100 is, as described above, configured so that a drive/driven relation at the pulleys can switch, thereby allowing a range of whole transmission ratio extended to be wider than a ratio range of the pulley unit itself. How much the pulley shaft distance can be shortened and how different outer diameters of the pulleys should be will be described below with reference to FIG. 3 and FIG. 4 respectively.

FIG. 3 is a graph to show a correlation among a pulley shaft distance, a range of whole transmission ratio (i.e. overall ratio range) and a ratio of different outer diameters when a belt outer diameter is φB[mm] in the continuously variable transmission in accordance with the present invention. Note that the "ratio of different outer diameters" as used herein means a value that is defined by a ratio between outer diameters of the first and second pulleys 11, 12: φODia1φ/ODia2, whereas the "range of whole transmission ratio" as used herein means a transmission ratio of whole transmission acquired by multiplying a transmission ratio (i.e. pulley ratio) between the first and second pulleys 11, 12 by all gear ratios fired, $i_{red}$, $i_{ind}$, $i_{LoF}$, $i_{hiF}$ in accordance with the first and second transmission gear assemblies 8, 9 and the low and final gear ratio 16, 18. The "R" means a target value of range of whole transmission ratio which the present invention aims to achieve. The pulley shaft distance A [mm] and the belt outer diameter φB [mm] are both experienced values adopted in mass-produced vehicles.

Figure 3A:
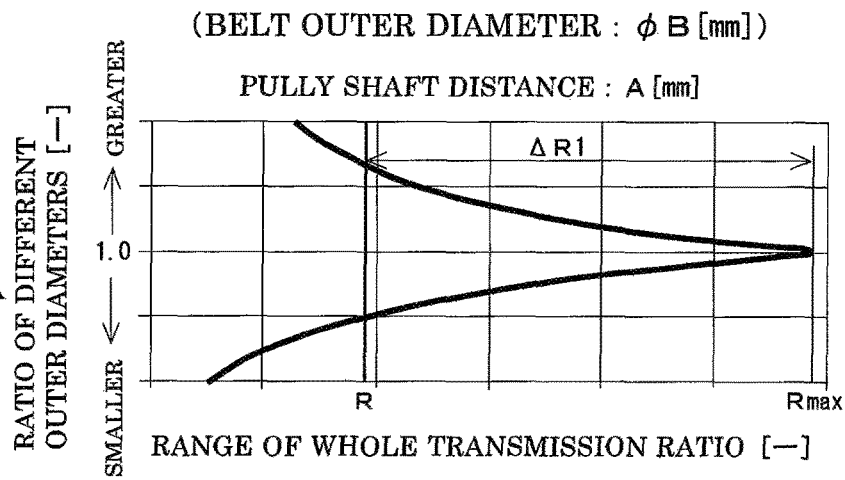
FIG. 3 is a graph to show a correlation among a pulley shaft distance, a range of whole transmission ratio (i.e. overall ratio range) and a ratio of different outer diameters when a belt outer diameter is φB[mm] in a continuously variable transmission in accordance with the present invention.
Figure 4:
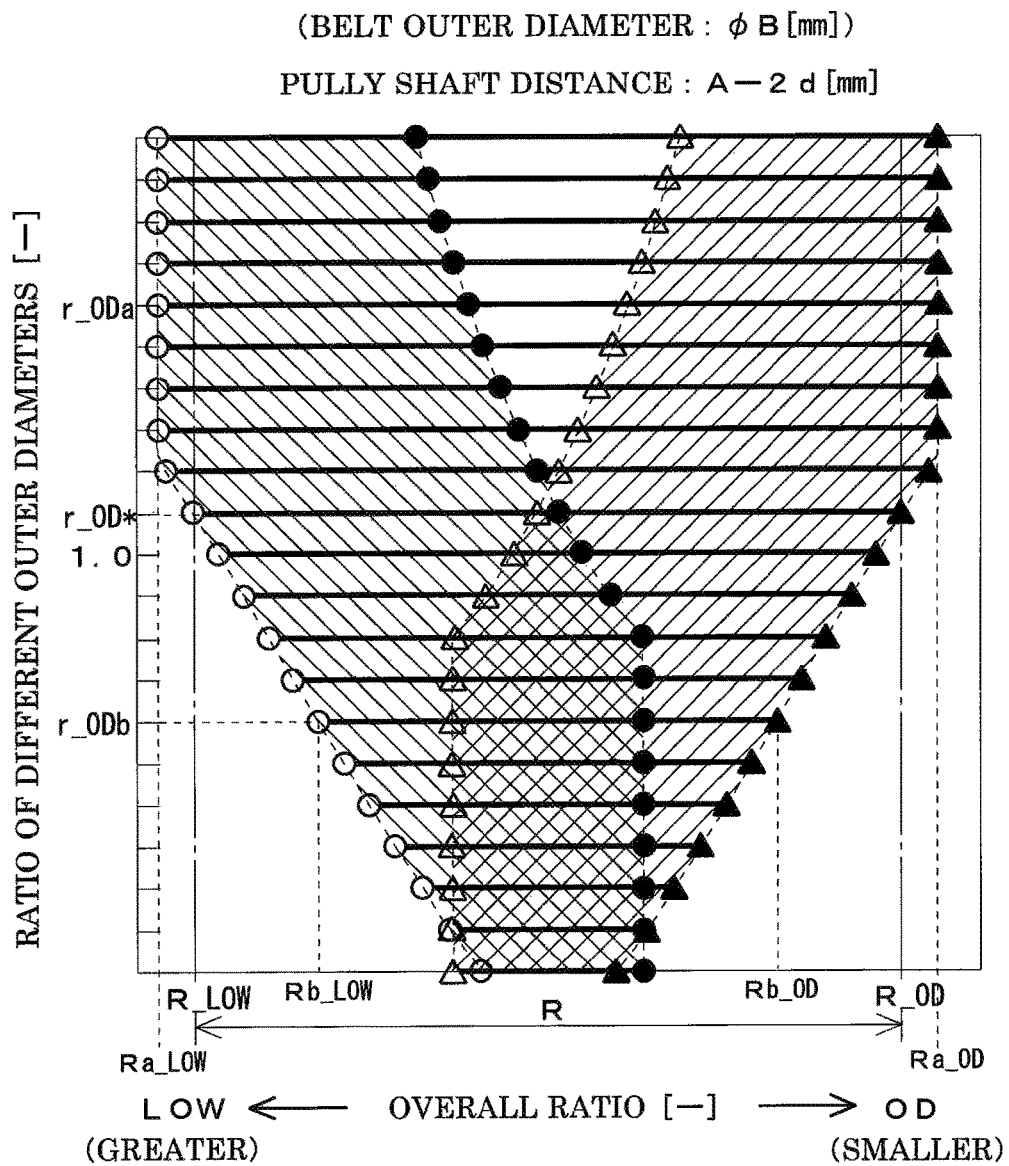
FIG. 4 is a graph to show a correlation between a ratio of different outer diameters and an overall ratio when a pulley shaft distance is A−2d[mm] and a belt outer diameter is φB[mm] in a continuously variable transmission in accordance with the present invention.

As shown in FIG. 3A, a range of whole transmission ratio has maximum value (i.e. peak value) Rmax when the ratio of different outer diameters is equal to 1, reducing in proportion as the ratio of different outer diameters becomes greater or smaller than 1. Therefore, by selecting a value nearly equal to 1 as the ratio of different outer diameters, it is possible to ensure a large range of whole transmission ratio. However, it is found that the range of whole transmission ratio at the ratio of different outer diameters nearly equal to 1, has a sufficient margin (i.e. overspecified margin) for the target value R. Therefore, in the continuously variable transmission, the pulley shaft distance A [mm] is further shorten, thereby allowing a pulley ratio range of the pulley unit itself to be narrower. As the result, it becomes possible to make the first and second pulleys 11, 12 to operate within a range where the V-belt 13 has a high transmitting efficiency and small ring damage (i.e. belt fatigue).

Figure 3B:
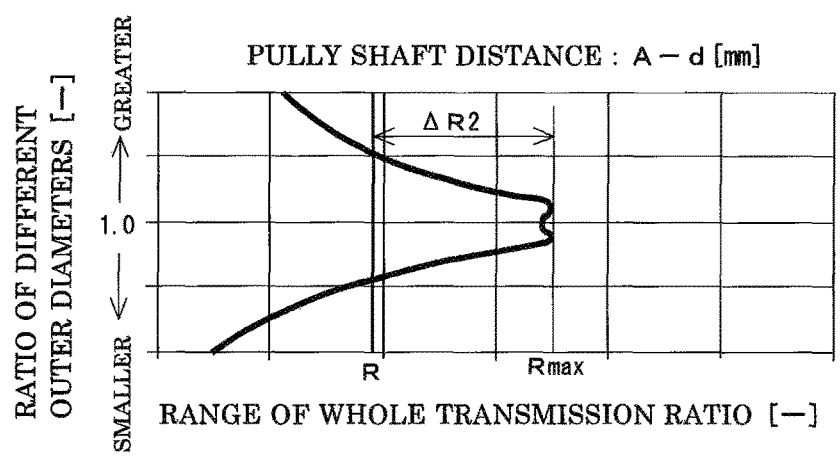

As shown in FIG. 3B, when a pulley shaft distance is further shortened by d[mm] from A[mm], two peak values Rmax are produced at both sides with respect to the ratio of different outer diameters equal to 1, and the peak value Rmax lowers in comparison with the FIG. 3A. However, a difference ΔR2 (<ΔR1) is found between target value R and peak value Rmax, suggesting that a range of whole transmission ratio in vicinity of 1 still has a sufficient margin for the target value R. Therefore, in the continuously variable transmission, the pulley shaft distance A−d[mm] is further shorten. As the result, it becomes possible to make the first and second pulleys 11, 12 to operate within a range where the V-belt 13 has a high transmitting efficiency and ring damage (i.e. belt fatigue).

Figure 3C:
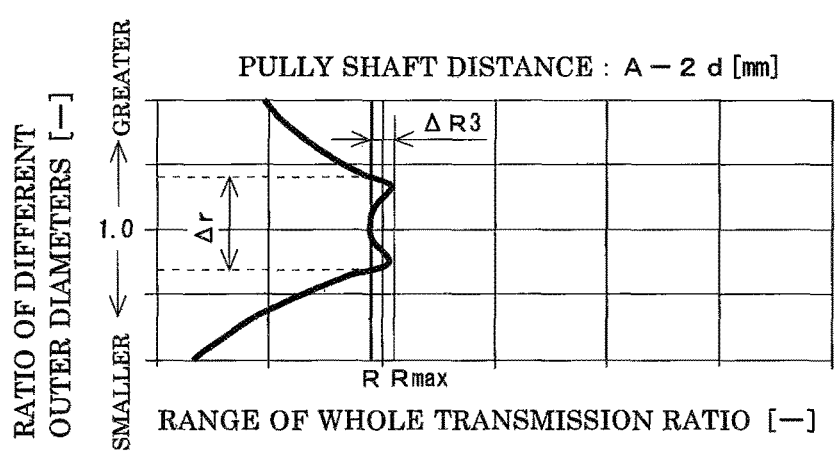

As shown in FIG. 3C, when a pulley shaft distance is further shortened by d[mm] from A−d[mm], two peak values Rmax are, as FIG. 3B, produced at both sides with respect to the ratio of different outer diameters equal to 1, and the peak value Rmax further lowers in comparison with the FIG. 3B to be closer to the target value R. In the result, it turns out that, when a belt outer diameter is φB[mm] in the continuously variable transmission, the pulley shaft distance A[mm] is capable of being shorten with 2d[mm]. A ratio of different outer diameters according to the present invention is supposed to be selected in a ratio range of different outer diameters Δr_OD satisfied with the target value R of range of whole transmission ratio. Which value should be selected as the ratio range of different outer diameters Δr_OD is described below with reference to FIG. 4.

FIG. 4 is a graph to show a correlation between a ratio of different outer diameters and an overall ratio when a pulley shaft distance is A−2d[mm] and a belt outer diameter is φB[mm] in the continuously variable transmission in accordance with the present invention. Symbols ○, ●, Δ, ▲ in FIG. 4 respectively indicate low and overdrive ends of pulley ratio range in the low-speed mode (i.e. LO mode) and low and overdrive ends of pulley ratio range in the high-speed mode (i.e. HI mode). Also, a shadow area sloping down rightward indicates an operation range of the pulleys at the low-speed mode, whereas a shadow area sloping up rightward indicates an operation range of the pulleys at the high-speed mode. Therefore, a horizontal length reaching from left end (○) to right end (▲) at each ratio of different outer diameters indicates a range of whole transmission ratio (i.e. overall ratio range) of the continuously variable transmission in accordance with the present invention.

As shown in FIG. 4, the overall ratio range is beyond the target overall ratio range R at ratio of different outer diameters equal to r_ODa, since the LOW end is Ra_LOW (>R_LOW) and the OD end is Ra_OD (<R_OD). Similarly, the overall ratio range is less than the target overall ratio range R at ratio of different outer diameters equal to r_ODb, since the LOW end is Rb_LOW (<R_LOW) and the OD end is Rb_OD (>R_OD). As described above, by checking each of LOW and OD ends of overall ratio range at each ratio of different outer diameters as to whether the overall ratio range is equal to target value R, the overall ratio range is found to be almost equal to target value R when ratio of different outer diameters is equal to r_OD*. Note that an engagement shock possibly occurs when a difference revolution happens at mode switching between high and low speed modes, even though the overall ratio range is equal to target value R. For example, as at ratio of different outer diameters r_Oda, when a blank interval (i.e. no values) is produced between OD end of low-speed mode and LOW end of high-speed mode, the blank interval indicates that there exists a difference revolution. Therefore, a selected ratio of different outer diameters is required to have no difference revolution. Namely, OD end of the low-speed mode and LOW end of the high-speed mode need to overlap each other. Note that for small difference revolution there do not occur any problem since an absorbing capacity of difference revolution and an engagement shock in the change of transmission ratio can be lowered when a clutch etc. is used as a switching mechanism. If there are a number of ratios of different outer diameters to be satisfied with the target value R and the requirement of difference revolution, such a ratio of different outer diameters is selected as having a pulley ratio range where belt has the highest efficiency and the smallest ring damage, based upon FIG. 15. In the result, a pulley ratio range according to the present invention is selected at a ratio of different outer diameters equal to e.g. r_OD*. Some embodiments are described below with respect to the continuously variable transmission 100 according to the present invention including the first and second pulleys 11, 12.

Embodiment 1

Figure 5:
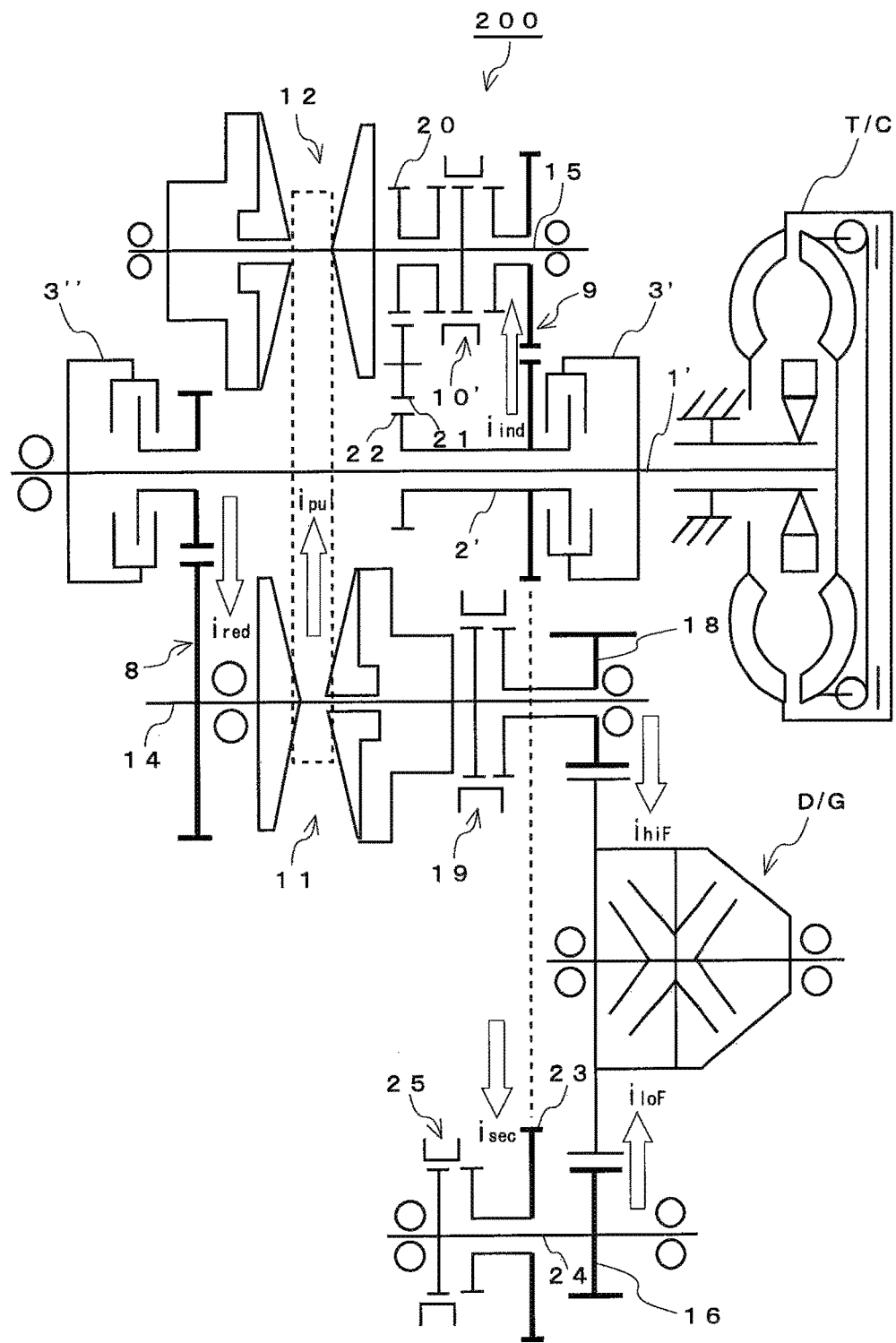
FIG. 5 is an explanation drawing to show a configuration of a continuously variable transmission in accordance with first embodiment of the present invention.

FIG. 5 is an explanation drawing to show a configuration of a continuously variable transmission 200 in accordance with first embodiment of the present invention. This continuously variable transmission 200 is modified in respect of the following in comparison with the continuously variable transmission 100.

(1) Respecting a structure of the input shaft, the continuously variable transmission 100 has a serial coaxial structure whereas the continuously variable transmission 200 has a parallel coaxial structure.

(2) Switching between the low and high speed modes is performed by the first synchronizer 10 in the continuously variable transmission 100 whereas it is performed by a clutch for high-speed mode (i.e. HI clutch) 3' and a clutch for low-speed mode (i.e. LO clutch) 3" in the continuously variable transmission 200.

(3) Engagement of the first transmission gear assembly 8 with shaft is performed by the first synchronizer 10 in the continuously variable transmission 100 whereas it is performed by the LO clutch 3" in the continuously variable transmission 200.

(4) Disposition of the second transmission gear assembly 9 is changed from the second input shaft 2 to the second output shaft 15 and the engagement of the second transmission gear assembly 9 with the second output shaft 15 is performed by a forward/reverse synchronizer (i.e. D/R synchronizer) 10'.

(5) Reverse mode is performed by the planetary gear mechanism and the reverse brake 7 in the continuously variable transmission 100 whereas it is performed by a reverse drive gear 20, a reverse idle gear 21 and a reverse driven gear 22 in the continuously variable transmission 200. Selection of the reverse drive gear 20 is conducted by the D/R synchronizer 10'.

(6) A third output shaft 24 is newly provided where a reduction gear 23 to mesh with the second transmission gear assembly 9 is disposed as well as a synchronizer for low-speed mode (i.e. synchronizer for low final gear or LO synchronizer) 25 to engage the reduction gear 23 with the third output shaft 24.

Figure 6:
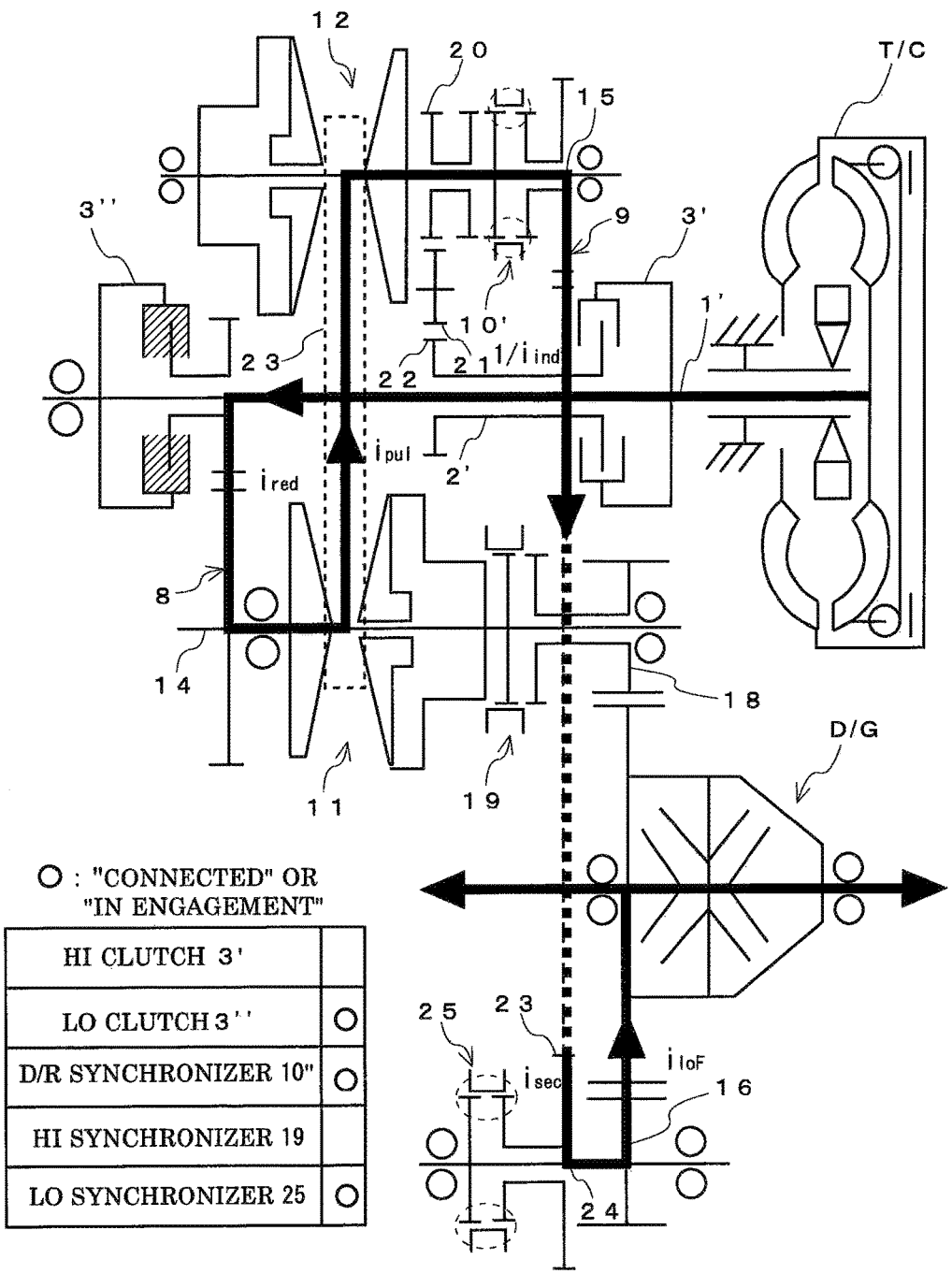
FIG. 6 is an explanation drawing to show a power transmission path (i.e. torque flow) in low-speed mode (i.e. LO mode) of a continuously variable transmission in accordance with the present invention.

FIG. 6 is an explanation drawing to show a power transmission path (i.e. torque flow) in low-speed mode (i.e. LO mode) of the continuously variable transmission 200 in accordance with the present invention. Note that the synchronizer for low final gear 25 and the synchronizer for high final gear 19 are hereinafter referred as the LO synchronizer 25, the HI synchronizer 19, respectively. When the HI clutch 3' is firstly in disengagement, the LO clutch 3" in engagement, further the D/R synchronizer 10' engaged with a forward side (i.e. the second transmission gear assembly 9), the HI synchronizer 19 in disengagement, the LO synchronizer 25 in engagement, and each of curvature radii continuously varied at the first and second pulleys 11, 12; a drive torque input from the torque converter T/C is supposed to be transmitted to wheels along such a transmission path as the first input shaft 1', LO clutch 3", first transmission gear assembly 8, first output shaft 14, first pulley 11, V-belt 23, second pulley 12, second output shaft 15, D/R synchronizer 10', second transmission gear assembly 9, second reduction gear 23, LO synchronizer 25, third output shaft 24, low final gear 16 and differential D/G in that order.

A whole transmission ratio of the continuously variable transmission 200 in the low-speed mode is equal to "$i_{red} \times i_{puL} \times 1/i_{ind} \times i_{sec} \times i_{LoF}$" at a pulley ratio=$i_{puL}$, thereby allowing the whole transmission ratio to be high-geared by "$i_{sec}/i_{ind}$" in comparison with the continuously variable transmission 100.

Figure 7:
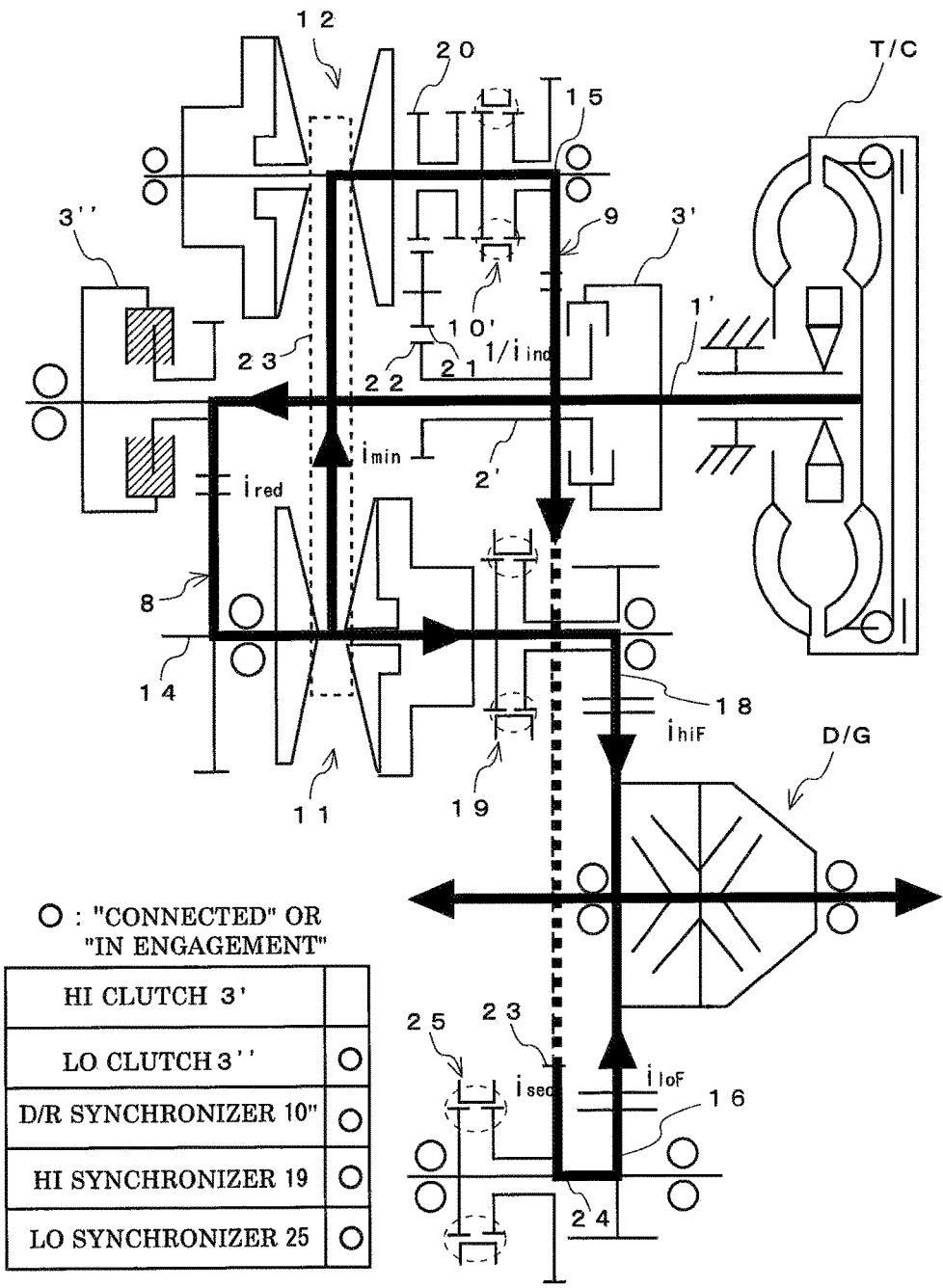
FIG. 7 is an explanation drawing to show a power transmission path (i.e. torque flow) at first transition mode of a continuously variable transmission in accordance with first embodiment of the present invention.

FIG. 7 is an explanation drawing to show a power transmission path (i.e. torque flow) at first transition mode of the continuously variable transmission 200 in accordance with the present invention. The "transition mode" as used herein means a transition from the low-speed mode to the high-speed mode, which is realized by performing such two modes of the first transition mode and a second transition mode shown in FIG. 8. When the pulley ratio $i_{puL}$ becomes equal to minimum value $i_{minL}$ (i.e. OD end), the HI synchronizer 19 is made to engage with the high final gear 18 at the first transition mode. As the result, the high final gear 18 is connected to the first output shaft 14 for rotation thereby a drive torque input from the torque converter T/C is divided into one torque flow passing the pulleys and other torque flow not passing the pulleys, at the first pulley 11. That is, the torque flow passing the pulleys indicates such a torque flow transmitted to the differential D/G along such a transmission path as the first pulley 11, V-belt 23, second pulley 12, second output shaft 15, D/R synchronizer 10', second transmission gear assembly 9, second reduction gear 23, LO synchronizer 25, third output shaft 24, low final gear 16, and differential D/G in that order. On the other hand, the torque flow not passing the pulleys indicates such a torque flow transmitted to the differential D/G along such a transmission path as the first output shaft 14, HI synchronizer 19, high final gear 18, and differential D/G in that order. Thus, the two of torque flows is to merge at the differential D/G when the HI synchronizer 19 is made to engage with the high final gear 18. At that time, in order to make difference revolution to be zero at the final driven gear of the differential D/G, each gear ratio of the above-mentioned gears is respectively selected so that each gear ratio is satisfied with the following expression 3.

$$i_{min} \times 1/i_{ind} \times i_{sec} \times i_{LoF} = i_{hiF}. \qquad \text{Expression 3}$$

Note that that the left side of the expression indicates a transmission ratio according to the torque flow passing the pulleys and the right side indicates a transmission ratio according to the torque flow not passing the pulleys.

Figure 8:
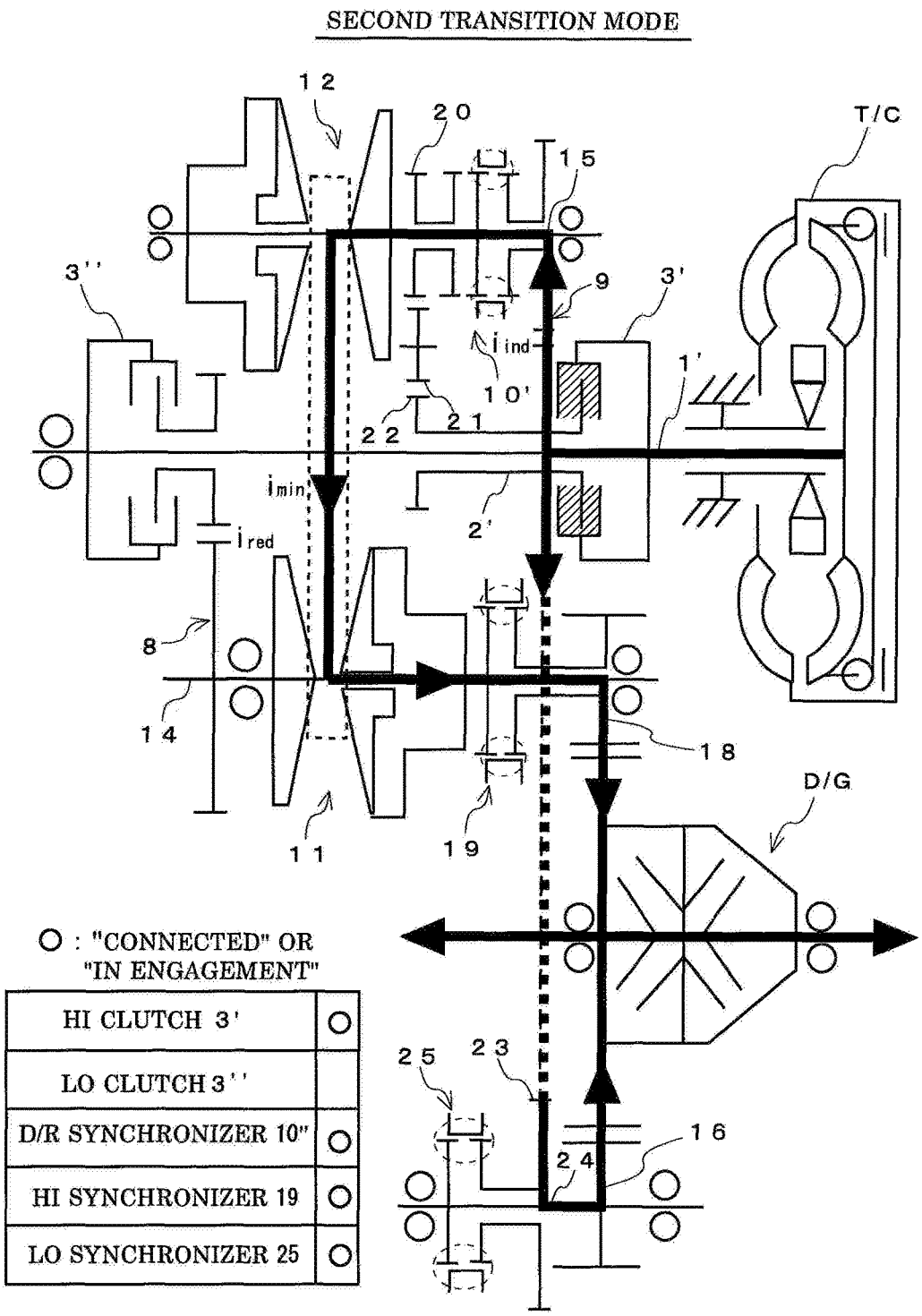
FIG. 8 is an explanation drawing to show a power transmission path (i.e. torque flow) at second transition mode of a continuously variable transmission in accordance with first embodiment of the present invention.

FIG. 8 is an explanation drawing to show a power transmission path (i.e. torque flow) at the second transition mode of the continuously variable transmission 200 in accordance with the present invention. Following the first transition mode, the second transition mode is conducted to switch clutches. That is, the HI clutch 3' is changed to be "in engagement" from "in disengagement" whereas the LO clutch 3" is changed to be "in disengagement" from "in engagement". As the result, the second pulley 12 switches to a drive pulley from a driven pulley whereas the first pulley 11 switches to a driven pulley from a drive pulley. Therefore, a drive torque input from the torque converter T/C is supposed to be divided into one torque flow passing the pulleys and other torque flow not passing pulleys, at the second input shaft 2. That is, the torque flow passing the pulleys indicates such a torque flow transmitted to the differential D/G along such a transmission path as the second transmission gear assembly 9, D/R synchronizer 10', second output shaft 15, second pulley 12, V-belt 23, first pulley 11, first output shaft 14, HI synchronizer 19, high final gear 18, and differential D/G in that order. On the other hand, the torque flow not passing the pulleys indicates such a torque flow transmitted to the differential D/G along such a transmission path as the second reduction gear 23, LO synchronizer 25, third output shaft 24, low final gear 16, and differential D/G in that order. Therefore, in order to make difference revolution to be zero at the second pulley 12 at that time of clutch switching, each gear ratio of the above-mentioned gears is respectively selected so that each gear ratio is satisfied with the following expression 4.

$$i_{red} \times i_{min} = i_{ind}. \qquad \text{Expression 4}$$

Note that that the left side of the expression indicates a transmission ratio prior to clutch switch and the right side indicates a transmission ratio after clutch switch.

In order to change low-speed mode to high-speed mode in the continuously variable transmission 200 according to the present invention, as shown in FIGS. 7 and 8, the HI synchronizer 19 is firstly made to engage with the high final gear 18 and then the HI clutch 3' is changed to be "in engagement" from "in disengagement" while the LO clutch 3" is changed to be "in disengagement" from "in engagement", thereby allowing the low-speed mode smoothly change to the high-speed mode.

Figure 9:
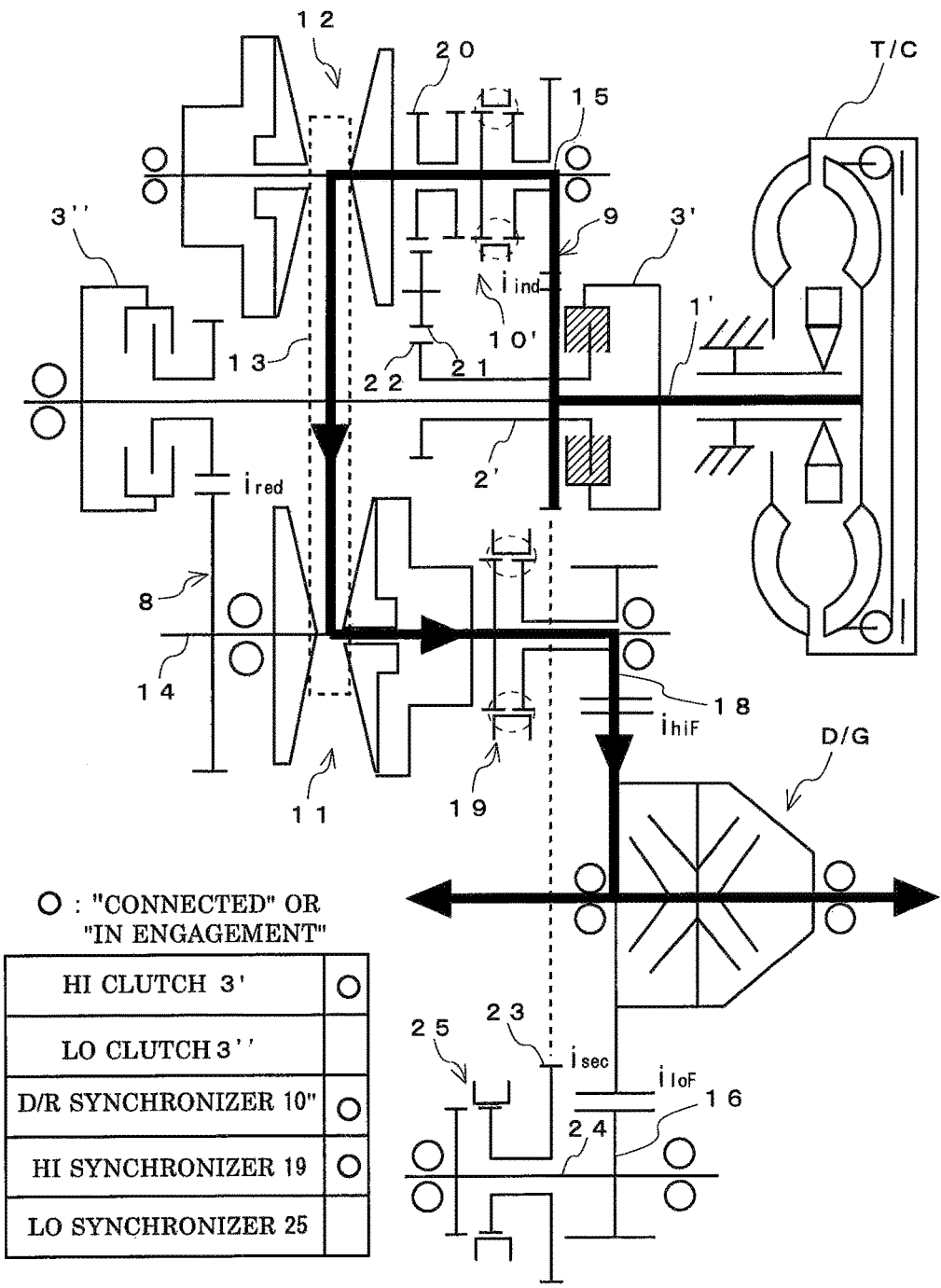
FIG. 9 is an explanation drawing to show a power transmission path (i.e. torque flow) in high-speed mode (i.e. HI mode) of a continuously variable transmission in accordance with first embodiment of the present invention.

FIG. 9 is an explanation drawing to show a power transmission path (i.e. torque flow) in the high-speed mode (i.e. high mode) of the continuously variable transmission 200 in accordance with the present invention. The LO synchronizer 25 is made to disengage with the second reduction gear 23 thereby allowing the second transition mode change to the high-speed mode. Therefore, each of curvature radii is continuously varied at the second and first pulleys 12,11; whereby a drive torque input from the torque converter T/C is supposed to be transmitted to wheels along such a transmission path as the first input shaft 1', HI clutch 3', second input shaft 2', second transmission gear assembly 9, D/R synchronizer 10', second output shaft 15, second pulley 12, V-belt 23, first pulley 11, first output shaft 14, HI synchronizer 19, high final gear 18, and differential D/G in that order.

Note that a process reverse to the above-mentioned process allows the high-speed mode to change to the second transition mode. That is, the LO synchronizer 25 is first made to engage with the second reduction gear 23 and then, the HI clutch 3' is changed to be "in disengagement" from "in engagement" while the LO clutch 3" is changed to be "in engagement" from "in disengagement", then the HI synchronizer 19 made to disengage with the high final gear 18 thereby allowing the high-speed mode smoothly to change to the low-speed mode.

Embodiment 2

Figure 10:
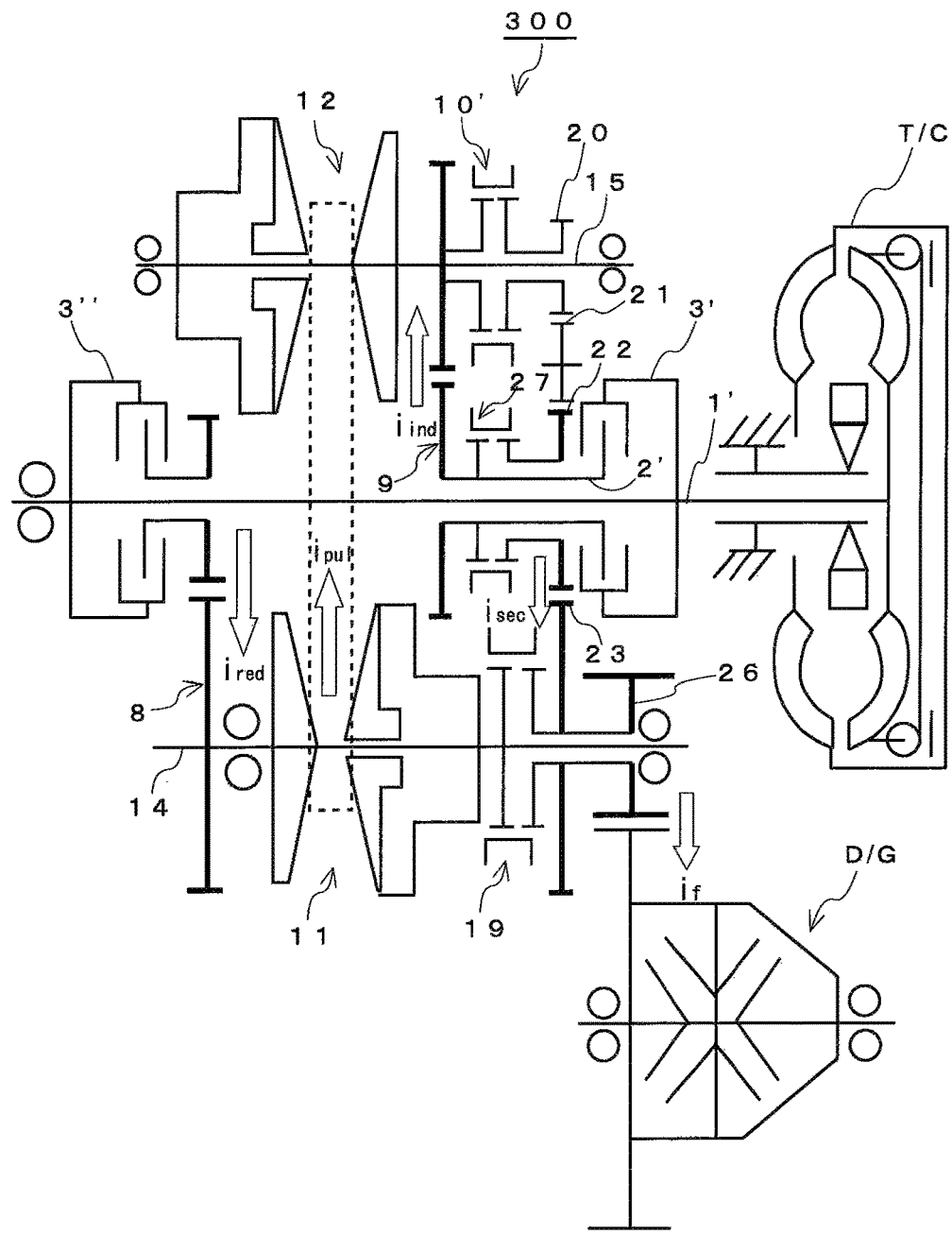
FIG. 10 is an explanation drawing to show a configuration of a continuously variable transmission in accordance with second embodiment of the present invention.

FIG. 10 is an explanation drawing to show a configuration of the continuously variable transmission 300 in accordance with second embodiment of the present invention. This continuously variable transmission 300 is modified in respect of the following in comparison with the continuously variable transmission 200.
(1) Respective final gears (i.e. low final gear 16 and high final gear 18) are provided dependent to modes with the continuously variable transmission 200 whereas a single final gear (i.e. final gear 26) is provided independent to modes with the continuously variable transmission 300. Note that the final gear 26 is rotatably supported on the first output shaft 14 and is connected for rotation with the first output shaft 14 by the third synchronizer 19.
(2) One gear of the second transmission gear assembly 9 is provided relatively rotatably on the second output shaft 15 in the continuously variable transmission 200, whereas one gear of the second transmission gear assembly 9 is constantly connected for rotation with the second output shaft 15 in the continuously variable transmission 300.
(3) The LO synchronizer 25 according to the low-speed mode is provided in the continuously variable transmission 200 whereas a fifth synchronizer 27 is provided on the second input shaft 2' in the continuously variable transmission 300.
(4) A third transmission gear assembly is comprised of other gear of the second transmission gear assembly 9 and the second reduction gear 23 in the continuously variable transmission 200, whereas a third transmission gear assembly is comprised of the reverse driven gear 22 and the second reduction gear 23 in the continuously variable transmission 300.

Note that the fifth synchronizer 27 of the continuously variable transmission 300 corresponds to the LO synchronizer 25 of the continuously variable transmission 200. For respective modes (i.e. low-speed mode, first transition mode, second transition mode and high-speed mode), operations of clutches and synchronizers in the continuously variable transmission 300 are almost same as operations in the continuously variable transmission 200. With a brief explanation of a drive torque transmission path (i.e. torque flow) in low-speed mode, a drive torque input from the torque converter T/C is supposed to be transmitted to wheels along such a transmission path as the torque converter T/C, first input shaft 1', LO clutch 3", first transmission gear assembly 8, first output shaft 14, first pulley 11, V-belt 23, second pulley 12, second output shaft 15, second transmission gear assembly 9, second input shaft 2', fifth synchronizer 27, reverse driven gear 22, second reduction gear 23, final gear 26, and differential D/G in that order.

On the other hand, with a brief explanation of a drive torque transmission path in high-speed mode, a drive torque input from the torque converter T/C is supposed to be transmitted to wheels along such a transmission path as the torque converter T/C, first input shaft 1', HI clutch 3', second transmission gear assembly 9, second output shaft 15, second pulley 12, V-belt 23, first pulley 11, first output shaft 14, third synchronizer 19, final gear 26, and differential D/G in that order.

Embodiment 3

Figure 11:
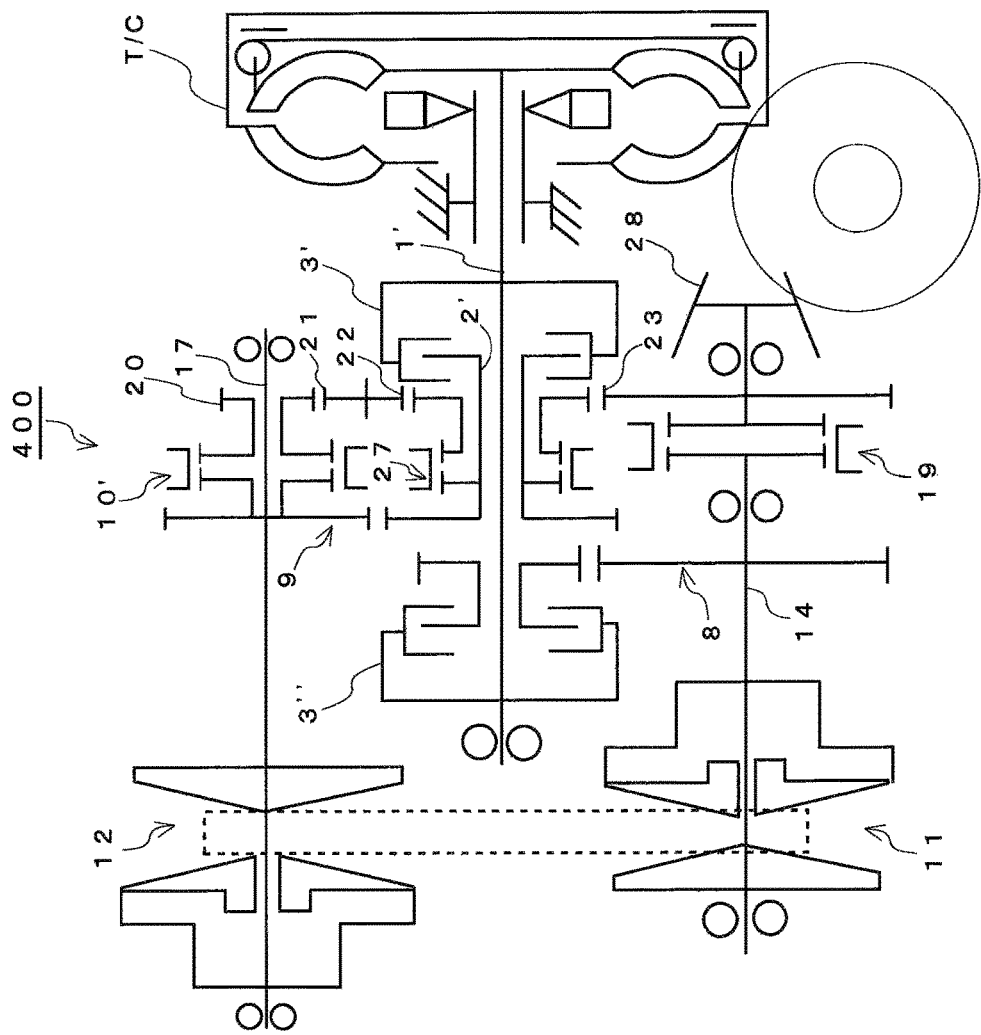
FIG. 11 is an explanation drawing to show a configuration of a continuously variable transmission in accordance with third embodiment of the present invention.

FIG. 11 is an explanation drawing to show a configuration of the continuously variable transmission 400 in accordance with the present invention. This continuously variable transmission 400 is, compared with the continuously variable transmission 300, modified so that the first and second pulleys 11, 12 are axially disposed at opposite side of the torque converter T/C thereby the LO clutch 3" and the first transmission gear assembly 8 are disposed between the pulleys and the second transmission gear assembly 9 and the final gear 26 of spur gear type is changed to a final gear 28 of bevel gear type. Therefore, this continuously variable transmission 400 is so-called longitudinal continuously variable transmission that is to be connected to longitudinal engine.

Also, an effect of sub-transmission allows pulley diameter to be small and a pulley position upward due to one mesh prior to pulleys. At the result, it becomes possible to restrict extension of a floor tunnel that is a problem in a longitudinal continuously variable transmission.

Figure 12:
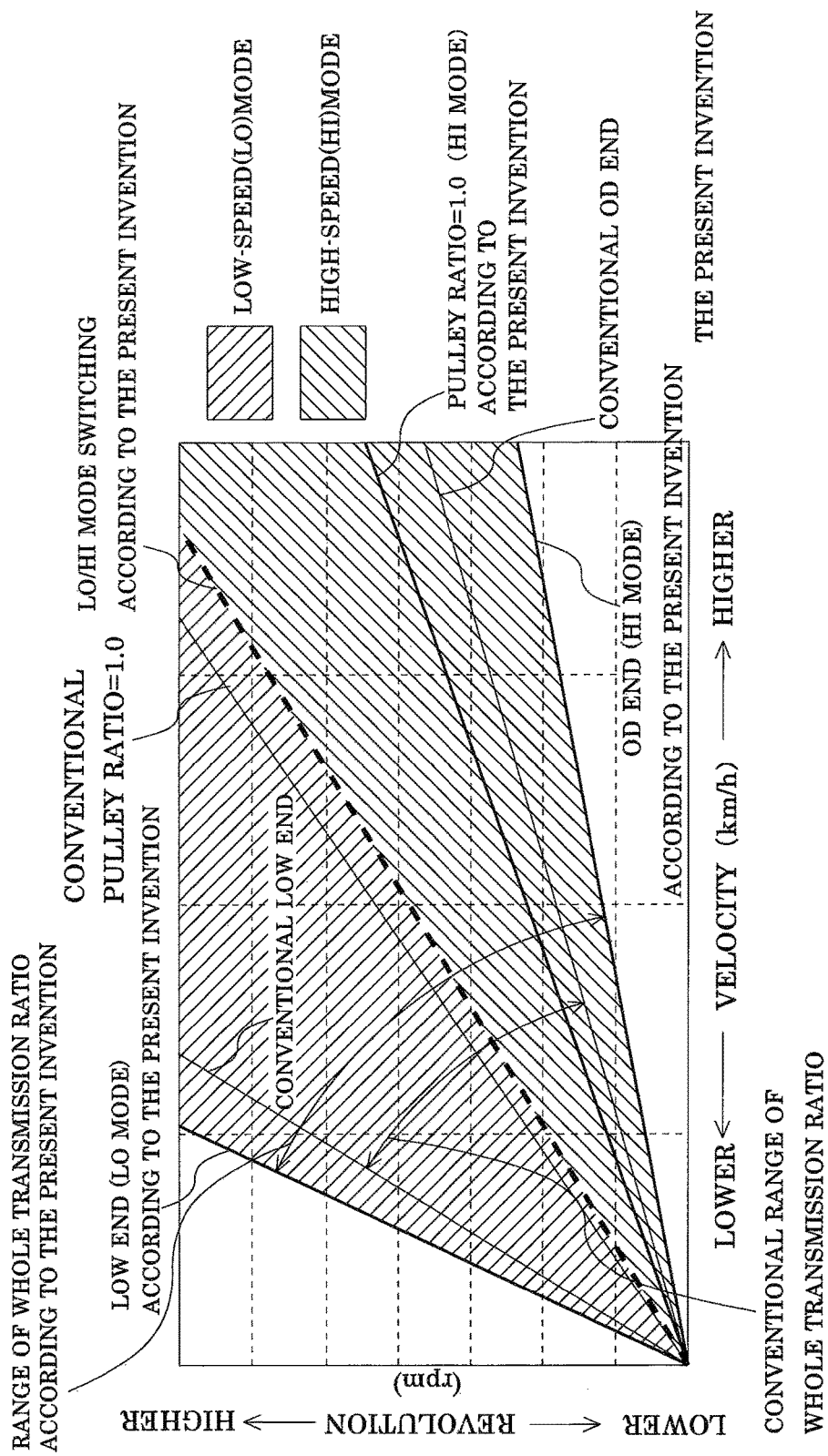
FIG. 12 is a graph to show a correlation between an engine revolution and a vehicle velocity of a continuously variable transmission in accordance with the present invention.

FIG. 12 is a graph to show a correlation between an engine revolution and a vehicle velocity of the continuously variable transmission in accordance with the present invention. Note that a correlation of low end, overdrive end and pulley ratio=1 therebetween of a conventional continuously variable transmission is also shown as a comparative example. Also, for convenience of explanation, only a correlation at pulley ratio=1 in high-speed mode of the present invention is shown in the FIG. 12. As is clear from the graph, a continuously variable transmission according the present invention is configured so that an input/output relation switches between the pulleys, whereby a continuously variable transmission according the present invention has two modes of low speed (i.e. LO) and high speed (i.e. HI) and has a wider transmission ratio range in comparison with a conventional continuously variable transmission. Especially, a low speed range is further low-geared, thereby allowing a necessary drive torque to be ensured at engine start. On the other hand, a high speed range is further high-geared, thereby allowing a necessary drive torque to be ensured at a vehicle cruise with low fuel consumption.

Also, the low and overdrive ends in the LO and HI modes of the present invention are both located nearer to the pulley ratio=1 than those of the conventional continuously variable transmission. Accordingly, the continuously variable transmission in accordance with the present invention is found to have a higher belt transmitting efficiency and a lower ring damage (i.e. belt fatigue).

As described above, in a continuously variable transmission 100, 200, 300, 400 according to the present invention, an outer diameter of the first pulley 11 is configured to be smaller than an outer diameter of the second pulley 12, thereby allowing the first and second pulley 11,12 to have a transmission ratio range narrowed. In the result, it becomes possibly to make the first and second pulleys 11, 12 operate within a range where the V-belt 13 has a high transmitting efficiency and small ring damage (i.e. belt fatigue). Also, an input/output relation (i.e. drive/driven relation) between the first and second pulleys 11, 12 is configured to mutually switch. Thus, it becomes possible to make a continuously variable transmission 100, 200, 300, 400 according the present invention to have a range of whole transmission ratio extended to be wider than a pulley ratio of pulley unit itself, even though the pulley unit itself has a pulley ratio range narrowed due to the configuration of different outer diameters of the pulleys. Therefore, for a transmission ratio range and a transmitting efficiency/load of the belt or a weight of the transmission in which a conventional continuously variable transmission has a trade-off correlation, a continuously variable transmission 100, 200, 300, 400 according the present invention allows for preferably ensuring a desired range of whole transmission ratio that will be required in the future while the belt has a high transmitting efficiency and small load without increasing weight of the transmission. Also, when the overall ratio range has some margins for a desired ratio range (i.e. target ratio range), it is possible to make a pulley shaft distance of the pulleys 11, 12 further shortened, thereby allowing the range of whole transmission ratio of the pulley unit itself to be much narrower (i.e. narrowed) and the first and second pulleys 11, 12 to operate within a range where the belt has a higher transmitting efficiency and smaller belt load. Therefore, a continuously variable transmission 100, 200, 300, 400 according to the present invention is applied to vehicle and consequently, fuel consumption rate of the vehicle is to be improved as well as the usable life of the power transmitting means like a V-belt, further, a lightweight of whole transmission to be realized.

It should be understood that embodiments according to the present invention are limited to only the above-mentioned. That is, it should be understood that the above-mentioned embodiments according to the present invention can be modified and changed within subjects of technical features according to the present invention. A toroidal type continuously variable transmission, as described below, can be provided to a continuously variable transmission according to the present invention, instead of a belt-type continuously variable transmission.

Embodiment 4

Figure 13:
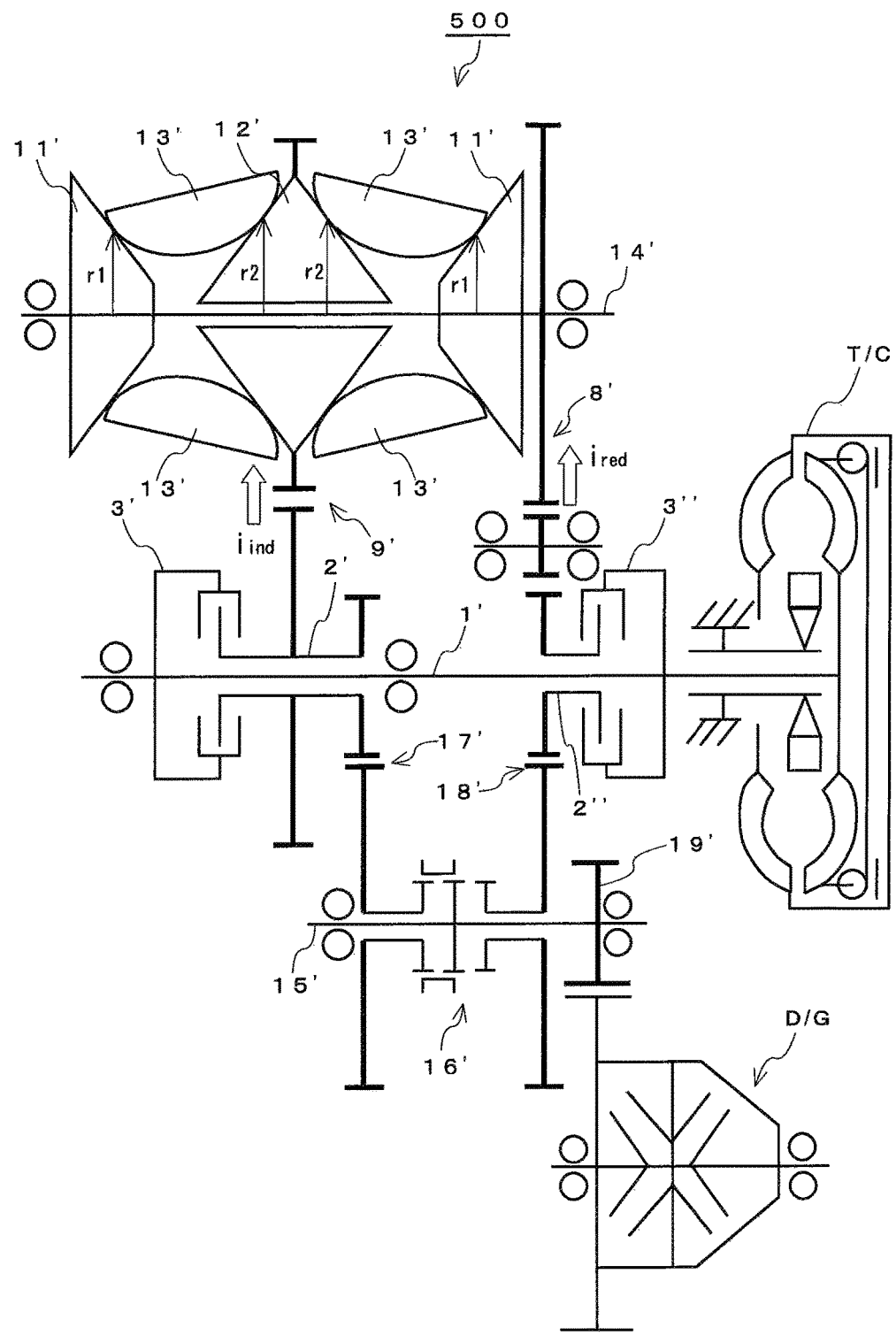
FIG. 13 is an explanation drawing to show a configuration of a continuously variable transmission in accordance with forth embodiment of the present invention.

FIG. 13 is an explanation drawing to show a configuration of continuously variable transmission 500 in accordance with forth embodiment of the present invention. This continuously variable transmission 500 comprises a toroidal-type continuously variable transmission (i.e. first and second disks 11', 12'). Thus, a power transmission between disks is supposed to be performed by a power-roller 13'. The continuously variable transmission 500 includes two disk assemblies of the first and second disks 11', 12' in which the second disk 12' is shared. Similar to the continuously variable transmission 100, 200, 300, 400, outer diameters of the first and second disks 11', 12' are configured to be mutually different.

Therefore, the continuously variable transmission 500 includes a first input shaft 1' receiving a drive torque input from a torque converter T/C; a second input shaft 2' having a parallel coaxial structure with the first input shaft 1', where each one gear of second and third transmission gear assemblies 9', 17' is fixed; a HI clutch 3' to engage the first input shaft 1' with the second input shaft 2'; a third input shaft 2" having a parallel coaxial structure with the first input shaft 1', where one gear of a fourth transmission gear assembly 18' is fixed; a LO clutch 3" to engage the first input shaft 1' with the third input shaft 2"; a first transmission gear assembly 8' to reduce a revolution of drive torque and transmit it to a first disk 11'; a second transmission gear assembly 9' to increase a revolution of drive torque and transmit it to a second disk 12'; two of first disks 11', a second disk 12' and four of power-rollers 13' which form a toroidal type continuously variable transmission; a first output shaft 14' on which the first disk 11' is fixed and the second disk 12' is rotatably supported; a second output shaft 15' on which each one gear of third or fourth transmission gear assemblies 17', 18' is respectively rotatably supported; a HI/LO switching synchronizer 16' to engage the third or fourth transmission gear assemblies 17', 18' with the second output shaft 15' for rotation; the third and fourth transmission gear assemblies 17', 18' transmitting a drive torque output from the first or second disk 11', 12'; and a final gear 19' to be a final reduction gear.

With a brief explanation of a drive torque transmission path, in low-speed mode, the LO clutch 4' is in engagement, the HI clutch 3' in disengagement and the HI/LO switching synchronizer made to move to the left to engage with the third transmission gear assembly 17'. As the result, a drive torque input from the torque converter T/C is supposed to be transmitted to wheels along such a transmission path as the first input shaft 1', LO clutch 3", third input shaft 2", first transmission gear assembly 8', first output shaft 14', first disk 11', power-roller 13', second disk 12', second transmission gear assembly 9', second input shaft 2', third transmission gear assembly 17', HI/LO switching synchronizer 16', second output shaft 15', final gear 19' and differential D/G in that order.

On the other hand, in high-speed mode, the LO clutch 4' is in disengagement, the HI clutch 3' in engagement and the HI/LO switching synchronizer 16' made to move to the right to engage with the fourth transmission gear assembly 18'. As the result, a drive torque input from the torque converter T/C is supposed to be transmitted to wheels along such a transmission path as the first input shaft 1', HI clutch 3', second input shaft 2', second transmission gear assembly 9', second disk 12', power-roller 13', first disk 11', first output shaft 14', first transmission gear assembly 8', fourth transmission gear assembly 18', HI/LO switching synchronizer 16', second output shaft 15', final gear 19' and differential D/G in that order.

Embodiment 5

Figure 14:
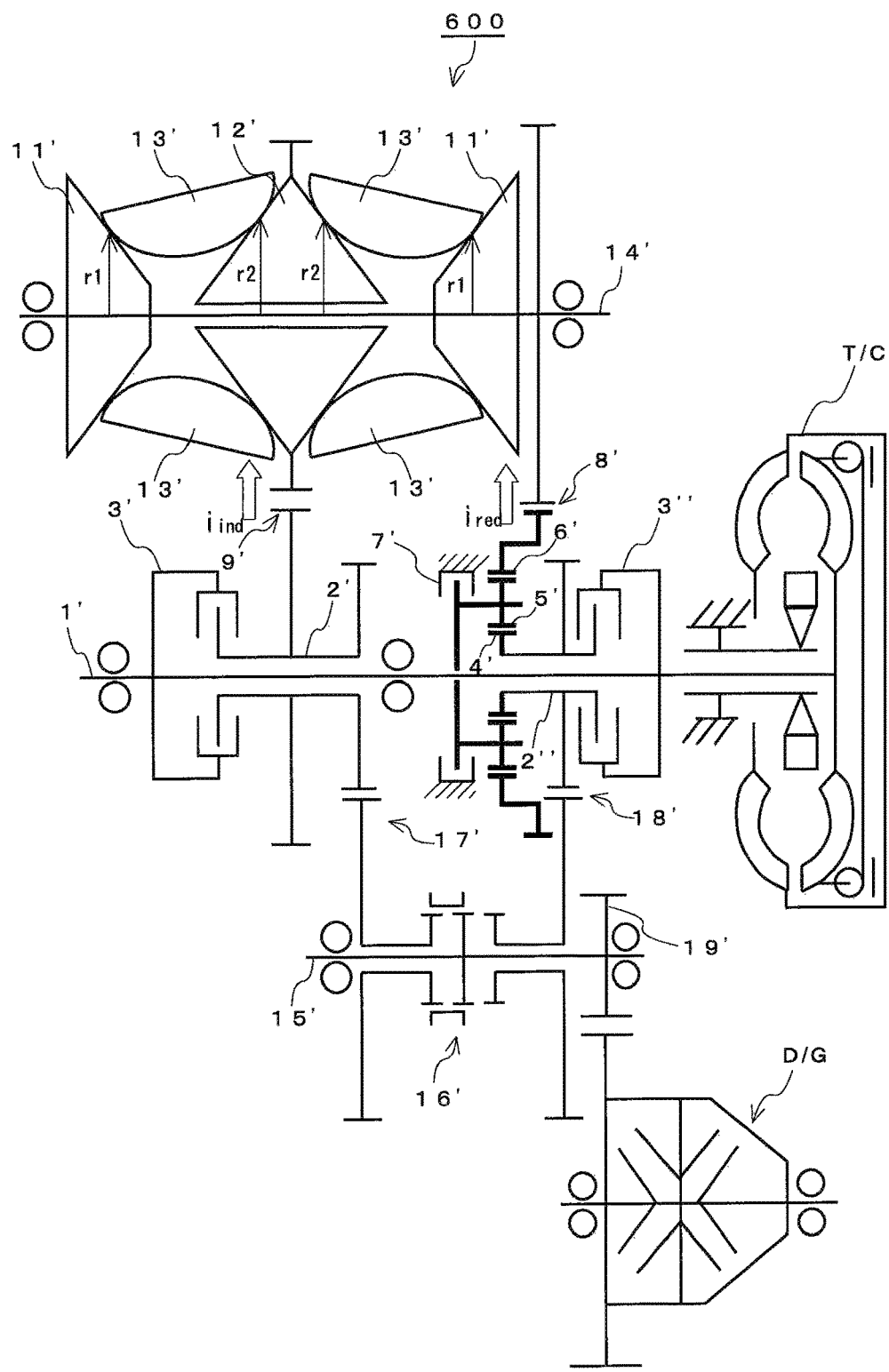
FIG. 14 is an explanation drawing to show a configuration of a continuously variable transmission in accordance with fifth embodiment of the present invention.

FIG. 14 is an explanation drawing to show a configuration of continuously variable transmission 600 in accordance with forth embodiment of the present invention. In comparison with the continuously variable transmission 500, this continuously variable transmission 600 is modified to comprise a planetary gear mechanism comprising a first input 1', a planetary gear 5' and a ring gear 6'; and a reverse brake 7' restricting a rotation of the planetary gear 5' around the sun gear 4. Therefore, the HI clutch 3' is in disengagement, LO clutch 3" in engagement, the reverse brake 7' in engagement, and the HI/LO switching synchronizer 16' made to move to the left to engage with the third transmission gear assembly 17'; thereby allowing a reverse mode to be realized.

The invention claimed is:

1. A continuously variable transmission comprising:
an input shaft receiving a drive torque input from a power source;
a first output shaft and a second output shaft disposed in parallel with the input shaft;
a first rotational mechanism disposed on the first output shaft;
a second rotational mechanism disposed on the second output shaft;
a power transmitting means transmitting a drive torque between the first and second mechanisms;
a first transmission gear assembly disposed in a power transmission path from the power source to the first rotational mechanism, the first transmission gear assembly changing a revolution of drive torque; and
a second transmission gear assembly disposed in a power transmission path from the second rotational mechanism to a differential, the second transmission gear assembly changing a revolution of drive torque, wherein an outer diameter of the first rotational mechanism is smaller than an outer diameter of the second rotational mechanism, and wherein the continuously variable transmission comprises
- a first transmission path wherein a drive torque from the power source is transmitted to the differential via a first clutch, the first output shaft, the first rotational mechanism, the second rotational mechanism and the second output shaft; and
- a second transmission path wherein a drive torque from the power source is transmitted to the differential via a second clutch, the second output shaft, the second rotational mechanism, the first rotational mechanism and the first output shaft.

2. A continuously variable transmission according to claim 1, wherein a maximum transmission ratio of the first transmission path is configured to be greater than a maximum transmission ratio of the second transmission path.

3. A continuously variable transmission according to claim 1, wherein the first and second transmission paths are configured to have a same transmission ratio when a transmission ratio between the first and second rotational mechanisms becomes equal to a given value.

* * * * *